US009348958B2

(12) United States Patent
Higuchi et al.

(10) Patent No.: US 9,348,958 B2
(45) Date of Patent: May 24, 2016

(54) METHOD AND APPARATUS FOR CALCULATING YIELD

(75) Inventors: Hiroyuki Higuchi, Kawasaki (JP); Yu Liu, Kawasaki (JP); Yuzi Kanazawa, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 300 days.

(21) Appl. No.: 13/564,773

(22) Filed: Aug. 2, 2012

(65) Prior Publication Data

US 2013/0046728 A1 Feb. 21, 2013

(30) Foreign Application Priority Data

Aug. 15, 2011 (JP) .................. 2011-177775

(51) Int. Cl.
*G06N 5/02* (2006.01)
*G06F 17/50* (2006.01)

(52) U.S. Cl.
CPC .......... *G06F 17/504* (2013.01); *G06F 2217/10* (2013.01); *G06N 5/02* (2013.01)

(58) Field of Classification Search
None
See application file for complete search history.

(56) References Cited

U.S. PATENT DOCUMENTS

| 6,313,666 | B1 | 11/2001 | Yamashita et al. | |
| 7,363,583 | B1 * | 4/2008 | Costa | 715/734 |
| 7,707,533 | B2 * | 4/2010 | McConaghy et al. | 716/119 |
| 2009/0027412 | A1 * | 1/2009 | Burley et al. | 345/582 |
| 2011/0219348 | A1 | 9/2011 | Liu | |
| 2012/0317200 | A1 * | 12/2012 | Chan | 709/204 |

FOREIGN PATENT DOCUMENTS

| JP | 6-096083 | 4/1994 |
| JP | 10-200394 | 7/1998 |
| JP | 2011-180866 | 9/2011 |

OTHER PUBLICATIONS

Hengl (Finding the right pixel size, Computers & Geosciences 32 (2006):1283-1298.*
Liu et al., "Generation of Yield-Embedded Pareto-Front for Simultaneous Optimization of Yield and Performances", Design Automation Conference (DAC), 2010 47th ACE/IEEE, Jun. 13-18, 2010, pp. 909-912.

* cited by examiner

*Primary Examiner* — Kakali Chaki
*Assistant Examiner* — Michael Zidanic
(74) *Attorney, Agent, or Firm* — Fujitsu Patent Center

(57) ABSTRACT

A disclosed method includes: converting, for each sample point, a set of performance item values for a sample point into coordinate values of a mesh element containing the set among plural mesh elements obtained by dividing a space mapped by the performance items; generating a binary decision graph representing a group of the coordinate values of the sample points; calculating the number of sample points including second sample points that dominates a first sample point and the first sample point, by counting the number of paths in the binary decision graph from a root node to a leaf node representing "1" through at least one of certain nodes corresponding to coordinate values that are equal to or less than coordinate values of the first sample point; and calculating a yield of the first sample point by dividing the calculated number by the number of the plural sample points.

15 Claims, 30 Drawing Sheets

| ID OF SAMPLE POINT | PERFORMANCE ITEM 1 | PERFORMANCE ITEM 2 | PERFORMANCE ITEM 3 | ... | PERFORMANCE ITEM M |
|---|---|---|---|---|---|
| 1 | A1 | B1 | C1 | | M1 |
| 2 | A2 | B2 | C2 | | M2 |
| 3 | A9 | B9 | C9 | | M9 |
| 4 | A10 | B10 | C10 | | M10 |
| ... | | | | | |

FIG.4

| ID OF SAMPLE POINT | PERFORMANCE ITEM 1 | PERFORMANCE ITEM 2 | PERFORMANCE ITEM 3 | ... | PERFORMANCE ITEM M | NO. OF SAMPLE POINTS | YIELD |
|---|---|---|---|---|---|---|---|
| 1 | α1 | β1 | γ1 | | ν1 | | |
| 2 | α2 | β2 | γ2 | | ν2 | | |
| 3 | α9 | β9 | γ9 | | ν9 | | |
| 4 | α10 | β10 | γ10 | | ν10 | | |
| ... | | | | | | | |

FIG.8

| VALUE | LEVEL |
|---|---|
| $x_1$ | 1 |
| $x_2$ | 2 |
| $x_3$ | 3 |
| $y_1$ | 4 |
| $y_2$ | 5 |
| $y_3$ | 6 |

| (x, y) | $f_2f_1$ | F |
|---|---|---|
| (1, 1) | 01 | 1 |
| (1, 2) | 00 | 0 |
| (1, 3) | 00 | 0 |
| (2, 1) | 00 | 0 |
| (2, 2) | 10 | 2 |
| (2, 3) | 01 | 1 |
| (3, 1) | 01 | 1 |
| (3, 2) | 00 | 0 |
| (3, 3) | 00 | 0 |

| 0 | 1 | 2 | 3 | 4 | 5 | 6 |
|---|---|---|---|---|---|---|
| 0 | 1 | -1 | -1 | -1 | -1 | -1 |

FIG.33A

| 0 | 1 | 2 | 3 | 4 | 5 | 6 |
|---|---|---|---|---|---|---|
| 0 | 1 | -1 | -1 | 0 | -1 | -1 |

FIG.33B

| 0 | 1 | 2 | 3 | 4 | 5 | 6 |
|---|---|---|---|---|---|---|
| 0 | 1 | -1 | -1 | 0 | -1 | 0 |

FIG.33C

| 0 | 1 | 2 | 3 | 4 | 5 | 6 |
|---|---|---|---|---|---|---|
| 0 | 1 | -1 | 0 | 0 | -1 | 0 |

FIG.33D

| 0 | 1 | 2 | 3 | 4 | 5 | 6 |
|---|---|---|---|---|---|---|
| 0 | 1 | -1 | 0 | 0 | 1 | 0 |

FIG.33E

| 0 | 1 | 2 | 3 | 4 | 5 | 6 |
|---|---|---|---|---|---|---|
| 0 | 1 | 1 | 0 | 0 | 0 | 0 |

FIG.33F

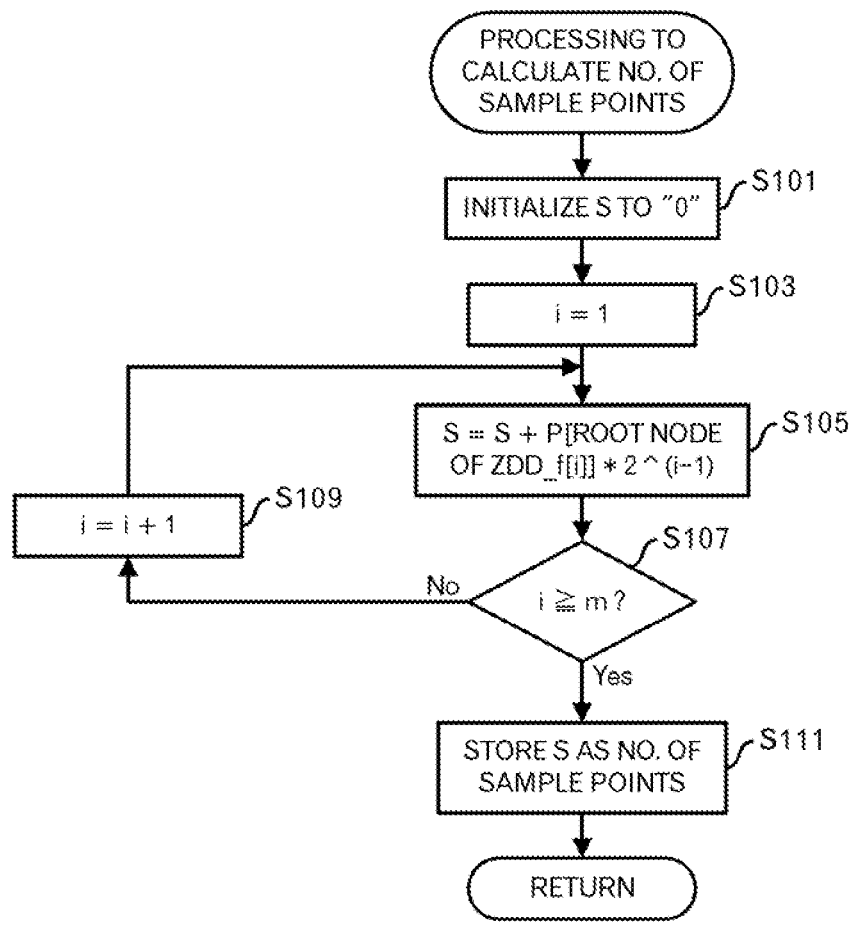

FIG.40

| ID OF SAMPLE POINT | PERFORMANCE ITEM 1 | PERFORMANCE ITEM 2 | PERFORMANCE ITEM 3 | ... | PERFORMANCE ITEM M | NO. OF SAMPLE POINTS | YIELD |
|---|---|---|---|---|---|---|---|
| 1 | α1 | β1 | γ1 | ... | ν1 | 30 | 0.3 |
| 2 | α2 | β2 | γ2 | ... | ν2 | 40 | 0.4 |
| 3 | α9 | β9 | γ9 | ... | ν9 | 50 | 0.5 |
| 4 | α10 | β10 | γ10 | ... | ν10 | 60 | 0.6 |
| ... | ... | ... | ... | ... | ... | | |

FIG.48

| ID OF SAMPLE POINT | PERFORMANCE ITEM 1 | PERFORMANCE ITEM 2 | PERFORMANCE ITEM 3 | ... | PERFORMANCE ITEM M | NO. OF SAMPLE POINTS | YIELD |
|---|---|---|---|---|---|---|---|
| 1 | α1 | β1 | γ1 | ... | ν1 | 30 | 0.3 |
| 2 | α2 | β2 | γ2 | ... | ν2 | | |
| 3 | α9 | β9 | γ9 | ... | ν9 | | |
| 4 | α10 | β10 | γ10 | ... | ν10 | | |
| ... | ... | ... | ... | ... | ... | | |

| $x_1$ | $x_2$ | $y_1$ | $y_2$ |

METHOD AND APPARATUS FOR CALCULATING YIELD

CROSS-REFERENCE TO RELATED APPLICATIONS

This application is based upon and claims the benefit of priority of the prior Japanese Patent Application No. 2011-177775, filed on Aug. 15, 2011, the entire contents of which are incorporated herein by reference.

FIELD

This technique relates to a design support technique.

BACKGROUND

Some automatic design techniques for analog circuits take into consideration the yield. In such automatic design techniques, when plural sample points are generated, each of which has plural kinds of performance item values (these are also called performances, totally. For example, gain, power consumption, linearity, area, noise, accuracy, dynamic range, impedance matching or the like) that are simulation results for combinations of specific design parameters and specific design variable values, while changing values in the combinations, the yield as represented below is defined for each of plural sample points.

On the premise, "the performance P1 at the sample point 1 dominates the performance P2 at the sample point 2" is defined as follows:

$$P1 \prec P2 \Leftrightarrow \forall i(p_{1i} \leq p_{2i}) \wedge \exists i(p_{1i} \leq p_{2i}), i=1 \ldots N \quad (1)$$

$p_{1i}$ represents a value of the i-th performance item included in the performance P1, and $p_{2i}$ represents a value of the i-th performance item included in the performance P2. The expression (1) represents that, when values of all of the performance items at the sample point 1 are equivalent to or better than values of the corresponding performance items at the sample point 2, and a value of any one performance item at the sample point 1 is better than a value of a corresponding performance item at the sample point 2, it is said that the performance P1 dominates the performance P2. When the performance P1 dominates the performance P2, it is also said that the sample point 1 dominates the sample point 2.

In addition, the domination relationship of the performance will be explained by using FIG. 1. Here, it is assumed that there are only two performance items, and the first performance item is represented by the vertical axis as a performance item 1, and the performance is higher when the lesser value is obtained. Moreover, it is assumed that the second performance item is represented by the horizontal axis as a performance item 2, and when the lesser value is obtained, the performance is higher. Here, when values of the performance items 1 and 2 are identified by carrying out the simulation, sample points are plotted on 2-dimensional space as illustrated in FIG. 1. In an example of FIG. 1, 6 sample points A to F are obtained. In such a situation, because the lesser value is naturally preferable for any of the performance items 1 and 2, the sample point which is nearer to the origin is better.

Then, "X dominates Y" represents that all components (i.e. performance item value) of Y is equal to or worse than the corresponding components of X, and at least one of the components of Y is worse than the corresponding component of X. In the two-dimensional space as illustrated in FIG. 1, because B whose values of the performance items 1 and 2 are lesser is a better sampling point than E, "B dominates E", and similarly, because C is a better sampling point than F, "C dominates F". On the other hand, when A is compared with B, because the A's value of the performance item 2 is lesser but the B's value of the performance item 1 is lesser, it cannot be said that "A dominates B". As for A to D, the dominancy relationship is not satisfied. Thus, the sampling points that are not dominated by the other sampling point in the performance space are called "Pareto" (also called "non-dominant solution"). Then, a curve A (in case of the three-dimensional or higher dimensional space, curved surface) connecting the Pareto is called "Pareto curve" (or "Pareto curved surface").

In addition, as illustrated in FIG. 2, the sample point is plotted at a position of a circle mark according to the performance item values, and a sample point focused this time is illustrated by a black circle. Incidentally, an ellipse with a hatch virtually represents a distribution area of the sample points. In such a case, sample points having the equivalent to or better values than those of the focused sample point for all of the performance items are sample points included in a rectangle measurement range whose upper right vertex is the black circle. Incidentally, the condition is similar even when the number of performance items is three or more.

In the aforementioned conventional technique, the appearance probability of the sample points having the performance equivalent to or better than that of a focused sample point is defined as the yield. Therefore, the yield is calculated by counting (the number of sample points that appear in the measurement range illustrated in FIG. 2 +1) and dividing the counted value by the number of all sample points.

However, when the yields are calculated for all sample points, a processing to confirm, for each focused sample point, the domination relationship with the other sample points is carried out. Accordingly, when the number of samples increases, it takes an extremely long processing time.

Namely, there is no technique for rapidly calculating the yield based on the domination relationship between sample points.

SUMMARY

A yield calculation method relating to this technique includes: (A) converting, for each of a plurality of sample points, a set of plural kinds of performance item values for a sample point into coordinate values of a mesh element containing the set among a plurality of mesh elements obtained by dividing a space mapped by plural kinds of performance items; (B) generating a binary decision graph representing a group of the coordinate values of the plurality of sample points; (C) first calculating the number of sample points including second sample points that dominates a first sample point and the first sample point, by counting the number of paths from a root node in the binary decision graph to a leaf node representing "1" in the binary decision graph through at least one of certain nodes corresponding to coordinate values that are equal to or less than coordinate values of the first sample point, wherein the second sample points and the first sample point are included in the plurality of sample points; and (D) second calculating a yield of the first sample point by dividing the calculated number by the number of the plurality of sample points.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a diagram depicting an example of data stored in a data storage unit;

FIG. 8 is a diagram depicting an example of data (i.e. coordinate list L) stored in the data storage unit;

FIG. 33A is a diagram depicting a first state of a hash table P;

FIG. 33B is a diagram depicting a second state of a hash table P;

FIG. 33C is a diagram depicting a third state of a hash table P;

FIG. 33D is a diagram depicting a fourth state of a hash table P;

FIG. 33E is a diagram depicting a fifth state of a hash table P;

FIG. 33F is a diagram depicting a sixth state of a hash table P;

FIG. 38 is a diagram depicting an example of the hash table P;

FIG. 39 is a diagram depicting a processing flow of the processing to count the number of sample points;

FIG. 40 is a diagram depicting an example of data stored in the data storage unit;

FIG. 48 is a diagram depicting an example of data stored in the data storage unit.

DESCRIPTION OF EMBODIMENTS

Embodiment 1

Figure 1:
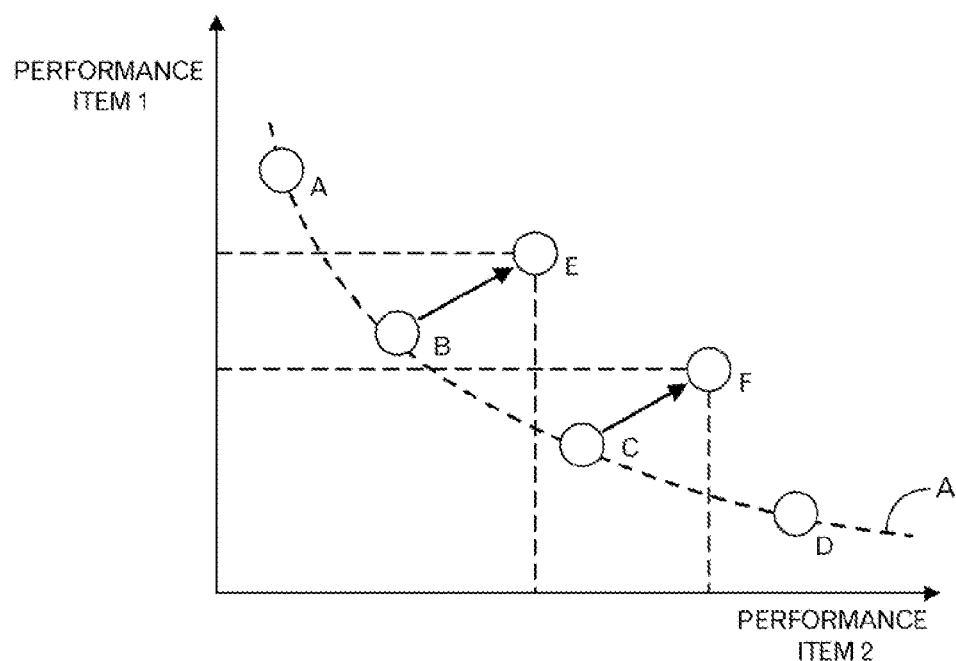
FIG. 1 is a diagram to explain a domination relationship of performances.
Figure 2:
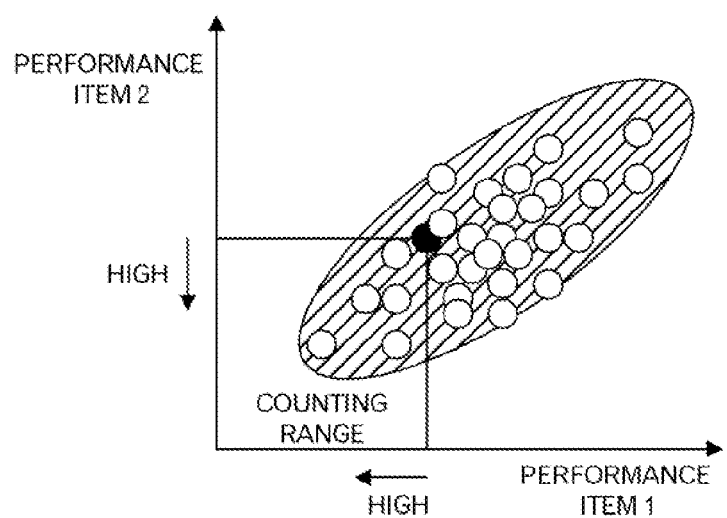
FIG. 2 is a diagram to explain a yield of a sample point.
Figure 3:
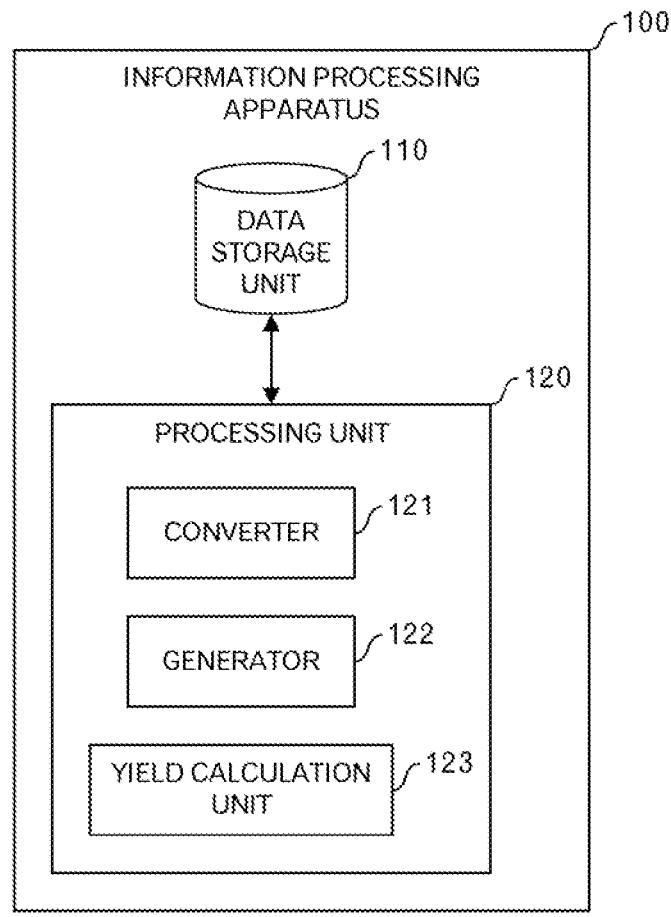
FIG. 3 is a functional block diagram of an information processing apparatus relating to a first embodiment.

FIG. 3 illustrates a functional block diagram of an information processing apparatus 100 relating to this embodiment. The information processing apparatus 100 has a data storage unit 110 and a processing unit 120 that carries out a processing using data stored in the data storage unit 110. The processing unit 120 has a converter 121, a generator 122 and a yield calculation unit 123.

The data storage unit 110 stores data as illustrated in FIG. 4, for example. In this embodiment, an identifier (ID) of the sample point and values of performance items 1 to M are registered. Separately, for each sample point, a corresponding circuit configuration, design variable values and design parameter values may also be registered in association with that data. However, because there is no direct relationship with this embodiment, they are omitted. For example, this information processing apparatus 100 or other computers carry out circuit simulations for the design variable values and design parameter values to obtain results of the circuit simulations (i.e. values of the performance items 1 to M), and store the obtained results into the data storage unit 110.

The converter 121 of the processing unit 120 carries out meshing of a performance item space mapped by the respective performance items, identifies, for each sample point, a mesh element containing the sample point, and identifies, as coordinate values of the sample point, coordinate values of the mesh element.

The generator 122 of the processing unit 120 generates a binary decision graph (BDD) (e.g. Zero-suppressed BDD (ZDD)) representing a set of sample points stored in the data storage unit 110.

The yield calculation unit 123 of the processing unit 120 carries out a processing using the binary decision graph to calculate the yield for each sample point, and stores the calculated yields into the data storage unit 110.

Next, a processing of the processing unit 120 will be explained by using FIGS. 5 to 42.

Figure 5:
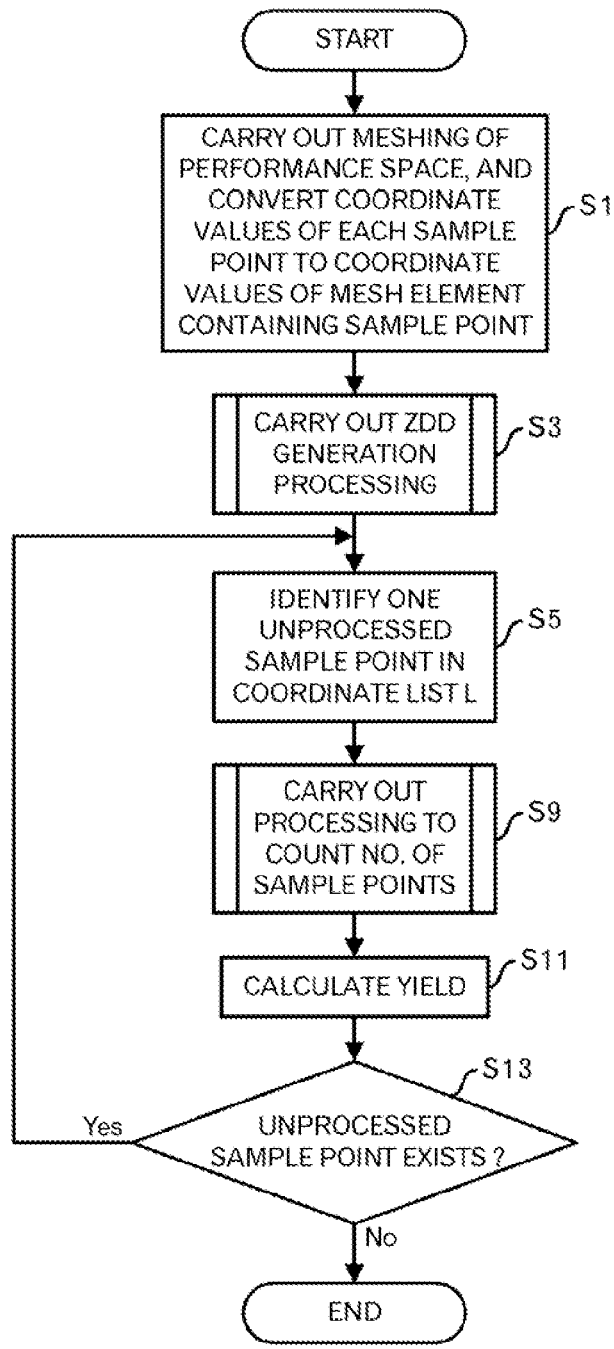
FIG. 5 is a diagram depicting a main processing flow relating to the first embodiment.

First, the converter 121 of the processing unit 120 carries out meshing of the performance space, and converts coordinate values (i.e. performance item values) of each sample point, which are stored in the data storage unit 110, to coordinate values of the mesh element containing the sample point, and stores the processing results into the data storage unit 110 (FIG. 5: step S1).

Figure 6:
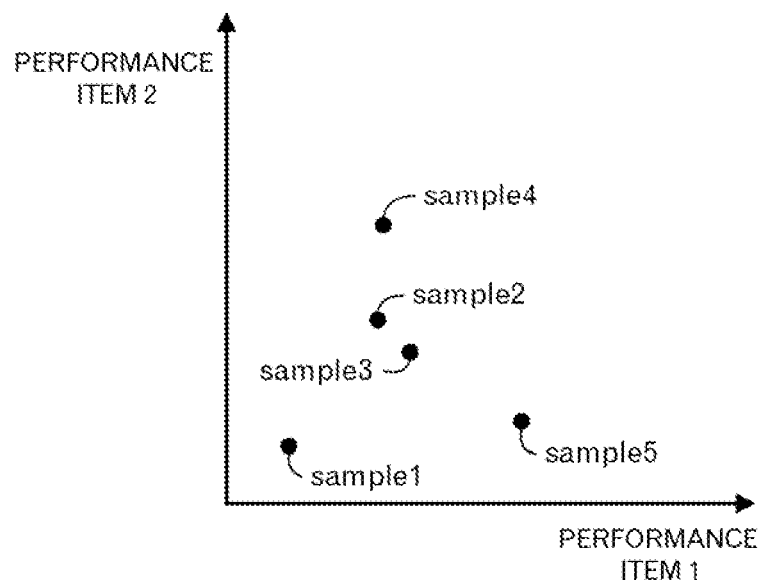
FIG. 6 is a diagram depicting an example of a performance space.
Figure 7:
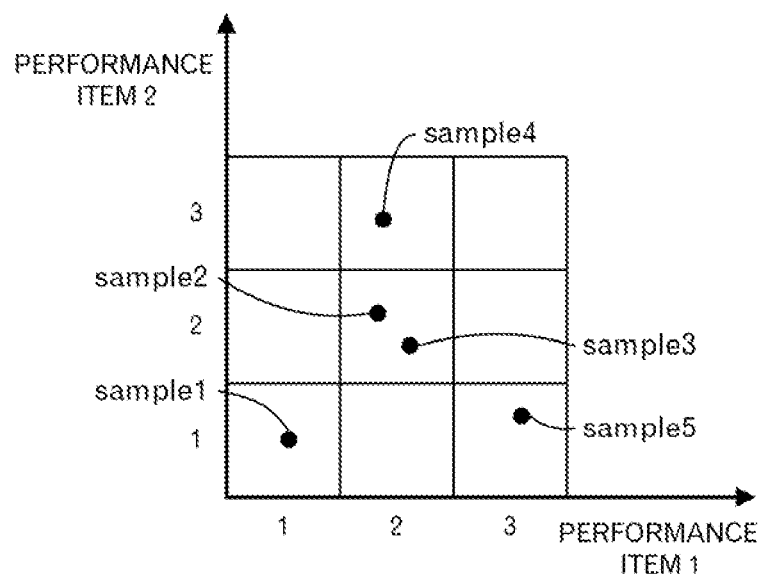
FIG. 7 is a diagram to explain meshing of the performance space.

For example, the performance space illustrated in FIG. 6 will be explained as one example. Here, in order to simplify the explanation, on a plane mapped by the performance items 1 and 2, 5 sample points sample1 to sample5 are considered. For example, it is assumed that sample1=(1.1, 1.1), sample2=(2.7, 3.2), sample3=(3.2, 2.7), sample4=(2.8, 4.9), and sample5=(5.1, 1.6). Here, as illustrated in FIG. 7, when this plane is divided into 3*3 mesh elements, the coordinate values of the sample points sample1 to sample5 are converted into sample1=(1,1), sample2=(2,2), sample3=(2,2), sample4=(2,3) and sample5=(3,1).

Typically, data as illustrated in FIG. 8 is stored in the data storage unit 110. Namely, an ID of the sample point and coordinate values of the performance items 1 to M are stored. However, the number of sample points and yields will be further stored in the processing described below. Such data is called "a coordinate list L".

Next, the generator 122 of the processing unit 120 carries out a ZDD generation processing to generate a ZDD representing a group of sample points, which are stored in the data storage unit 110 (step S3). The ZDD generation processing will be explained by using FIGS. 19 to 26.

Figures 9, 10:
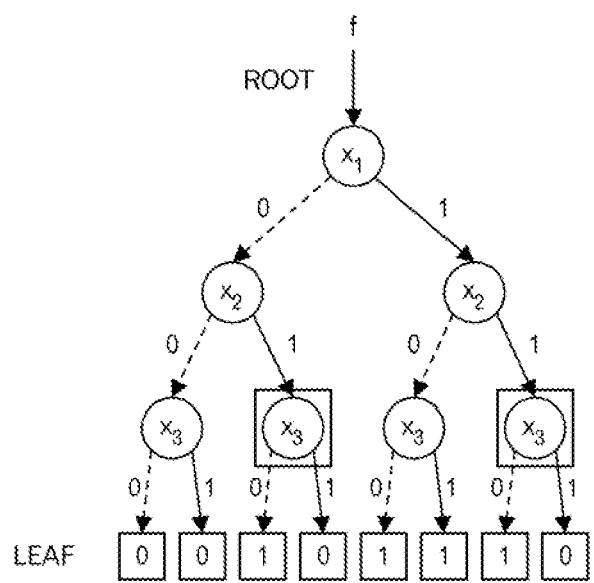
FIG. 9 is a diagram depicting an example of a truth table.
FIG. 10 is a diagram depicting an example of a binary decision tree.

Incidentally, before the explanation of the specific processing, BDD, which is a premise of ZDD, is explained. First, a binary decision graph BDD for a truth table as illustrated in FIG. 9 is explained. This truth table is represented by a following logical function $f(x_1, x_2, x_3)$. However, dash "'" represents "NOT". $f(x_1, x_2, x_3)=x_1'x_2x_3'+x_1x_2'+x_1x_2x_3'$ The binary decision graph represents such a logical function or truth table in a graph form by the compression, and operations between the logical functions can be made by a processing between the compressed graphs.

Such a truth table is represented by a binary decision tree as illustrated in FIG. 10. In the binary decision tree in FIG. 10, a branch in case where $x_1$ is true "1" and a branch in case where $x_1$ is false "0" extend from the node of $x_1$, which is a root node. Furthermore, a node of $x_2$ is connected to each of these branches, and a branch in case where $x_2$ is true "1" and a branch in case where $x_2$ is false "0" extend from the node of $x_2$. Moreover, a node of $x_3$ is connected to each of these branches, and a branch in case where $x_3$ is true "1" and a branch in case where $x_3$ is false "0" extend from the node of $x_3$. A leaf node representing "1" according to the truth table and a leaf node representing "0" according to the truth table are connected to each branch connected to the node of $x_3$.

Thus, a path from the root node to a leaf node representing "1" represents an input combination, which makes an output "1".

Typically, by integrating equivalent nodes, the binary decision tree as illustrated in FIG. 10 is compressed. In case of FIG. 10, as for two nodes of $x_3$, which are surrounded by a rectangle, a leaf node connected to the branch of false "0" represents "1" and a leaf node connected to the branch of true "1" represents "0". Therefore, they are equivalent nodes. Therefore, the two nodes can be integrated into one node.

Figure 11:
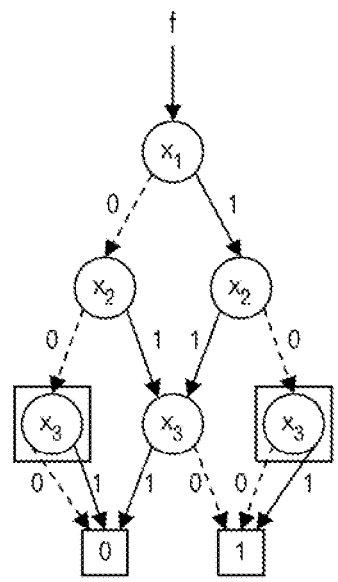
FIG. 11 is a diagram depicting an example of the binary decision graph when integrating nodes.

When such integration of the equivalent nodes is carried out, a temporal binary decision graph as illustrated in FIG. 11 is obtained.

Figure 12:
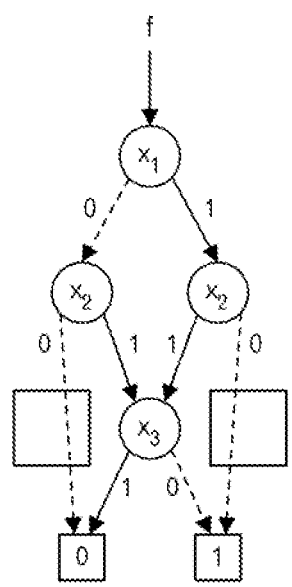
FIG. 12 is a diagram depicting an example of the binary decision graph when deleting redundant nodes.

Furthermore, by deleting redundant nodes, the graph is compressed as illustrated in FIG. 11. In FIG. 11, both of a branch of true "1" and a branch of false "0" of the left node of $x_3$, which is surrounded by the rectangle, are connected to a leaf node of "0", and this left node of $x_3$ is redundant. Furthermore, both of a branch of true "1" and a branch of false "0" of the right node of $x_3$ are connected to a leaf node of "1", and this right node of $x_3$ is redundant. Therefore, when these nodes are deleted, the binary decision graph as illustrated in FIG. 12 is obtained. Because the nodes are deleted, node in portions surrounded by the rectangle disappears in FIG. 12. Thus, a graph generated by deleting the equivalent nodes and redundant nodes from the binary decision tree is called "a binary decision graph".

Next, ZDD, which is a variety of BDD, is explained. It is known that ZDD is effective when there is a lot of false "0" in the input combinations whose output becomes "1" (i.e. in case of the sparse combination).

Figures 13, 14:
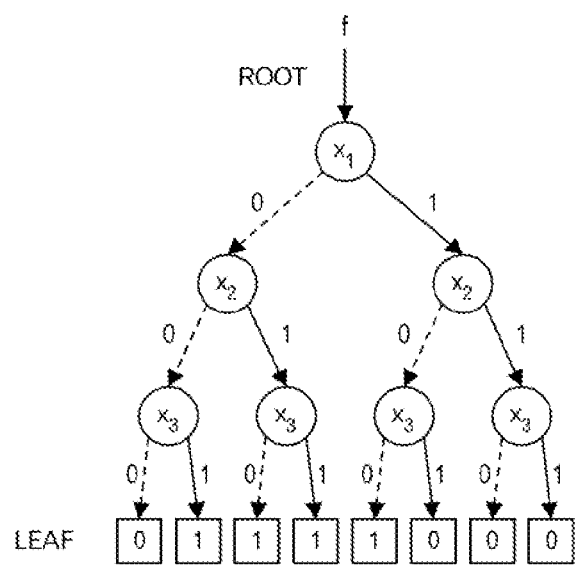
FIG. 13 is a diagram depicting an example of the truth table.
FIG. 14 is a diagram depicting an example of the binary decision tree.
Figure 15:
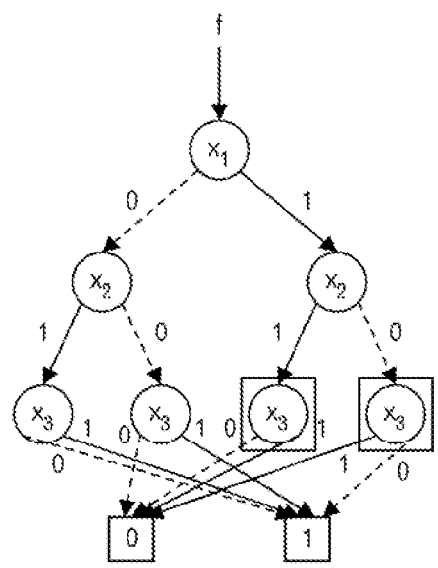
FIG. 15 is a diagram depicting an example of the binary decision graph after integrating the leaf nodes.
Figure 16:
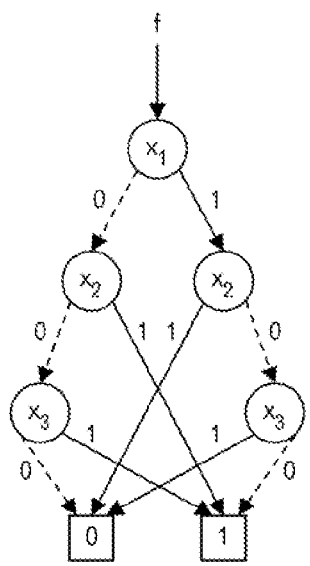
FIG. 16 is a diagram depicting an example of the binary decision graph after deleting the redundant nodes.

For example, in case of the truth table as illustrated in FIG. 13, the binary decision tree is represented as illustrated in FIG. 14. Incidentally, when integrating the leaf nodes, the binary decision tree is represented as illustrated in FIG. 15. As described above, in case of BDD, nodes connected to the same node in both cases of true "1" and false "0" are redundant nodes. Therefore, the most left node among 4 nodes of $x_3$ in FIG. 15 and third node from the left are identified as redundant nodes, and the binary decision graph as illustrated in FIG. 16 is obtained.

On the other hand, in ZDD, nodes whose branch of true "1" is connected to a leaf node representing "0" are deleted, and a branch of an upper node of the deleted node is connected to a node connected to a branch of false "0" of the deleted node.

Figure 17:
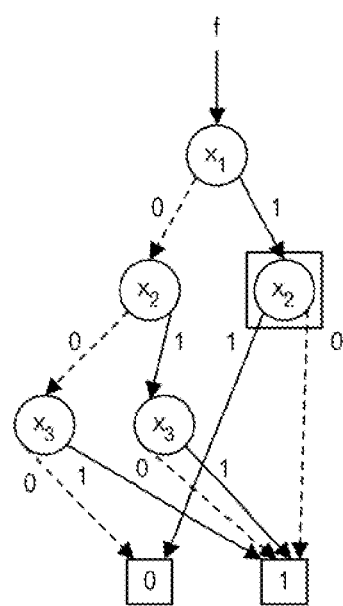
FIG. 17 is a diagram depicting a state in a ZDD generation process.
Figure 18:
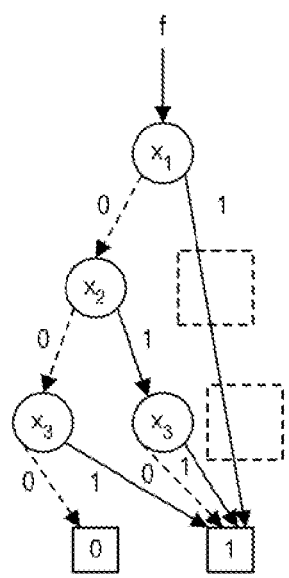
FIG. 18 is a diagram depicting an example of ZDD.

In case of FIG. 15, because a branch of true "1", which is connected to a right node $x_3$ surrounded by a rectangle, is connected to a leaf node representing "0", this node of $x_3$ is deleted, and a branch of false "0" connected to an upper node $x_2$ is connected to a lead node representing "1". In addition, because a branch of true "1", which is connected to a left node $x_3$ surrounded by a rectangle, is connected to a leaf node representing "0", this node $x_3$ is also deleted, and a branch of true "1", which is connected to an upper node $x_2$, is connected to a leaf node representing "0". Then, a temporary binary decision graph as illustrated in FIG. 17 is obtained. In this temporary binary decision graph, because a branch of true "1", which is connected to a node $x_2$ surrounded by a rectangle, is connected to a leaf node representing "0", this node $x_2$ is also deleted. Then, a branch of true "1", which is connected to an upper node of this node $x_2$, is connected to a leaf node representing "1". By carrying out such compression, ZDD as illustrated in FIG. 18 is obtained. In ZDD in FIG. 18, a rectangle portion drawn by a dotted line corresponds to a portion in which nodes are deleted.

Figure 19:
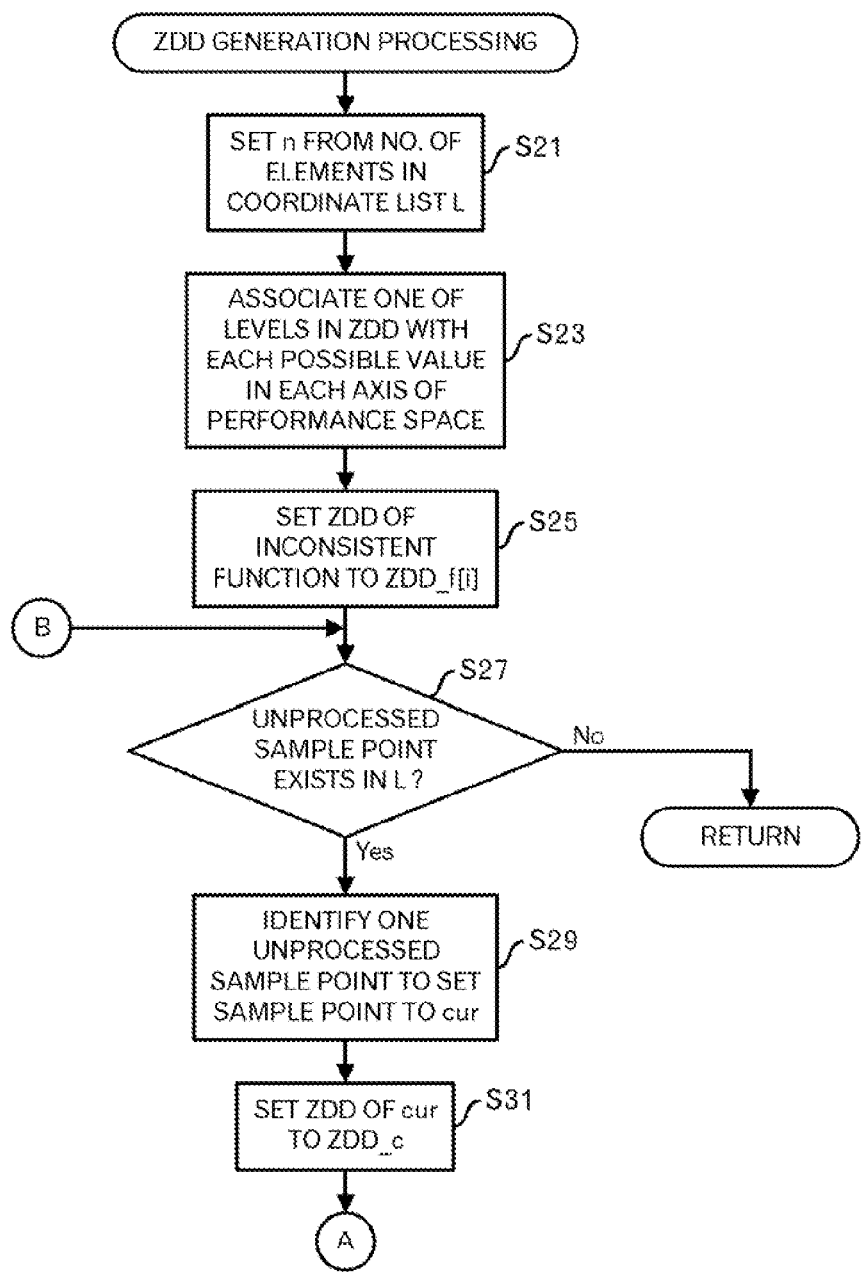
FIG. 19 is a diagram depicting a processing flow of a ZDD generation processing.

A processing to generate ZDD representing the coordinate list L in this embodiment will be explained by using processing flows in FIGS. 19 to 26. The generator 122 sets n from the number of sample points in the coordinate list L (FIG. 19: step S21). Specifically, n is calculated according to the following expression.

$$n = \lceil \log_2 (\text{no. of sample points in } L) \rceil$$

This expression represents that a value under the decimal point of the logarithm of the number of sample points in the coordinate list L to base 2 is rounded upwards to obtain an integer of the logarithm.

Figures 20, 21:
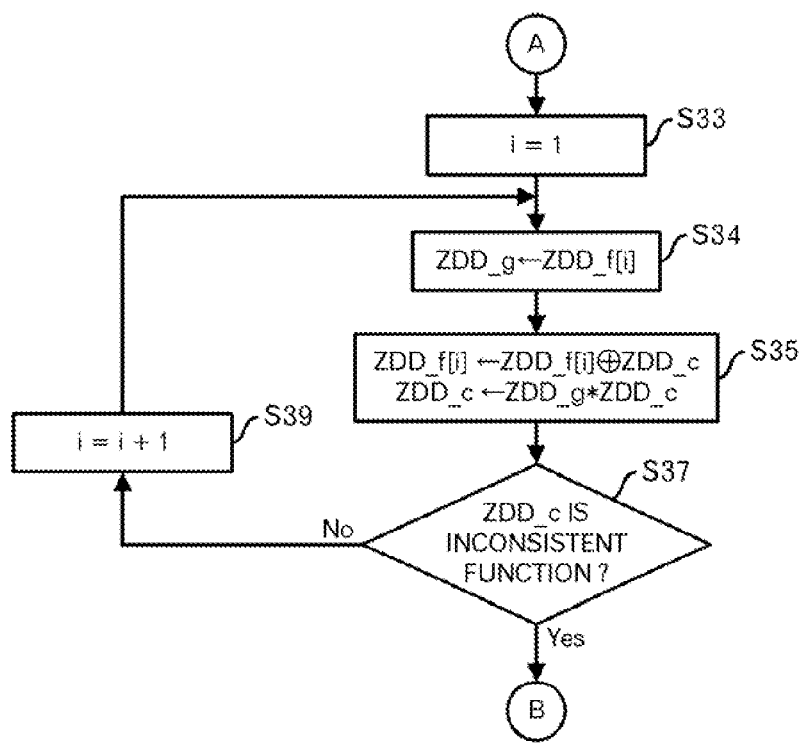
FIG. 20 is a diagram depicting an example of data of levels.
FIG. 21 is a diagram depicting a processing flow of the ZDD generation processing.

Then, the generator 122 associates one level of ZDD with each possible value for each axis representing the performance item, based on the results of the meshing, and stores data representing the association into the data storage unit 110 (step S23). For example, in the performance space as illustrated in FIG. 7, when the performance item 1 is represented by x and the performance item 2 is represented by y, the association between each of the possible values in each axis and a level is represented in FIG. 20. In an example of FIG. 20, because both of x and y vary from 1 to 3, levels 1 to 6 are allocated in order of $x_1$, $x_2$, $x_3$, $y_1$, $y_2$ and $y_3$. Here, the level of the leaf node is equal to or greater than 7.

Next, the generator 122 sets ZDD (including only leaf nodes representing "0") of an inconsistent function to ZDD_f [i] (i is an integer from 1 to n) (step S25).

Then, the generator 122 determines whether or not there is an unprocessed sample point in the coordinate list L (step S27). When there is no unprocessed sample point in the coordinate list L, the processing returns to the calling source processing. On the other hand, when there is an unprocessed sample point, the generator 122 identifies one unprocessed sample point in the coordinate list L, and sets the identified sample point to cur (step S29). Then, the generator 122 sets ZDD of the sample point cur to ZDD_c for a carry (step S31). Then, the processing shifts to a processing of FIG. 21 through terminal A.

Shifting to the explanation of the processing in FIG. 21, the generator 122 sets "1" to a counter i (step S33). Then, the generator 122 sets ZDD_f[i] to ZDD_g (step S34). ZDD_f[i] is saved to ZDD_g. After that, the generator 122 sets the result of ZDD_f[i]+ZDD_c (here, "+" represents an exclusive logical OR) to ZDD_f[i], and the result of ZDD_g*ZDD_c to ZDD_c (step S35). After that, when ZDD_c is an inconsistent function, namely, there is no carry, the processing returns to the step S27 in FIG. 19 through terminal B. On the other hand, when ZDD_c is not an inconsistent function, the generator 122 increments i by "1" (step S39), the processing returns to the step S34.

By carrying out such a processing, ZDD_f[i] is generated according to an appearance state of the sample points.

Here, a process to generate ZDD_f[i] representing 5 sample points as illustrated in FIG. 7 will be explained by using FIGS. 22 to 25. First, when sample point (1,1) is processed, ZDD_f[1] is an inconsistent function, and ZDD of the sample point (1,1) is set to ZDD_c. Then, when the step S35 is carried out, ZDD_f[1] that is an inconsistent function and ZDD_c of the sample point (1,1) are exclusively ORed, and ZDD_f[1] becomes ZDD of the sample point (1,1). Incidentally, since there is no carry because of ZDD_g*ZDD_c=0, the processing shifts to a processing for the next sample point.

Figure 22:
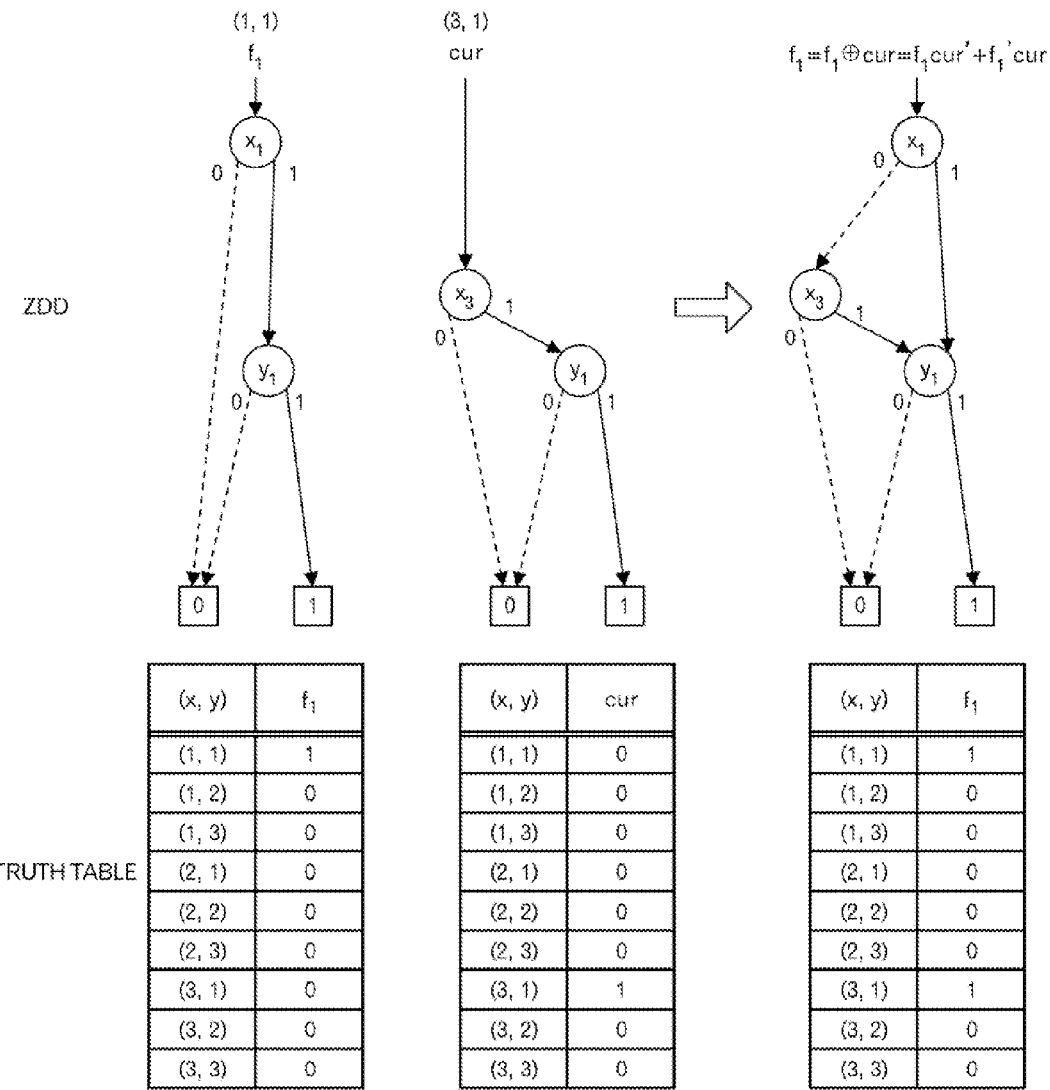
FIG. 22 is a diagram depicting a specific example of the ZDD generation.

Next, a case where the sample (3,1) is processed is explained by using FIG. 22. As illustrated in FIG. 22, when ZDD representing (1,1) and ZDD representing (3,1) are exclusively-ORed, ZDD representing (1,1) and (3,1) appear is generated. Incidentally, since there is no carry because of ZDD_g*ZDD_c=0, the processing shifts to a processing for the next sample point.

Figure 23:
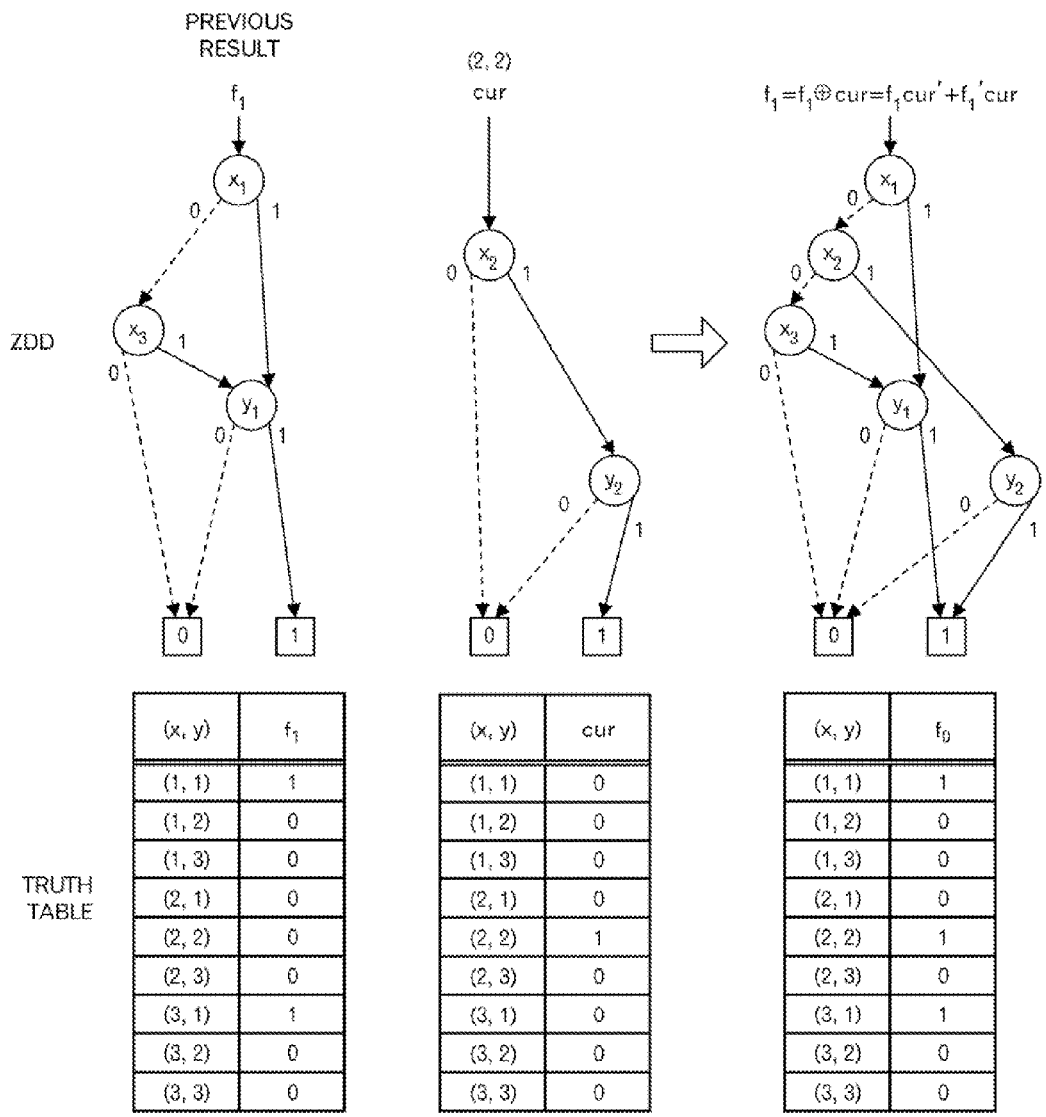
FIG. 23 is a diagram depicting a specific example of the ZDD generation.

Next, when the sample point (2,2) is processed, the processing is explained by using FIG. 23. As illustrated in FIG. 23, when ZDD representing the previous result and ZDD representing (2,2) are exclusively-ORed, ZDD representing (1,1), (3,1) and (2,2) appear is generated. Incidentally, since there is no carry because of ZDD_g*ZDD_c=0, the processing shifts to a processing for the next sample point.

Figure 24:
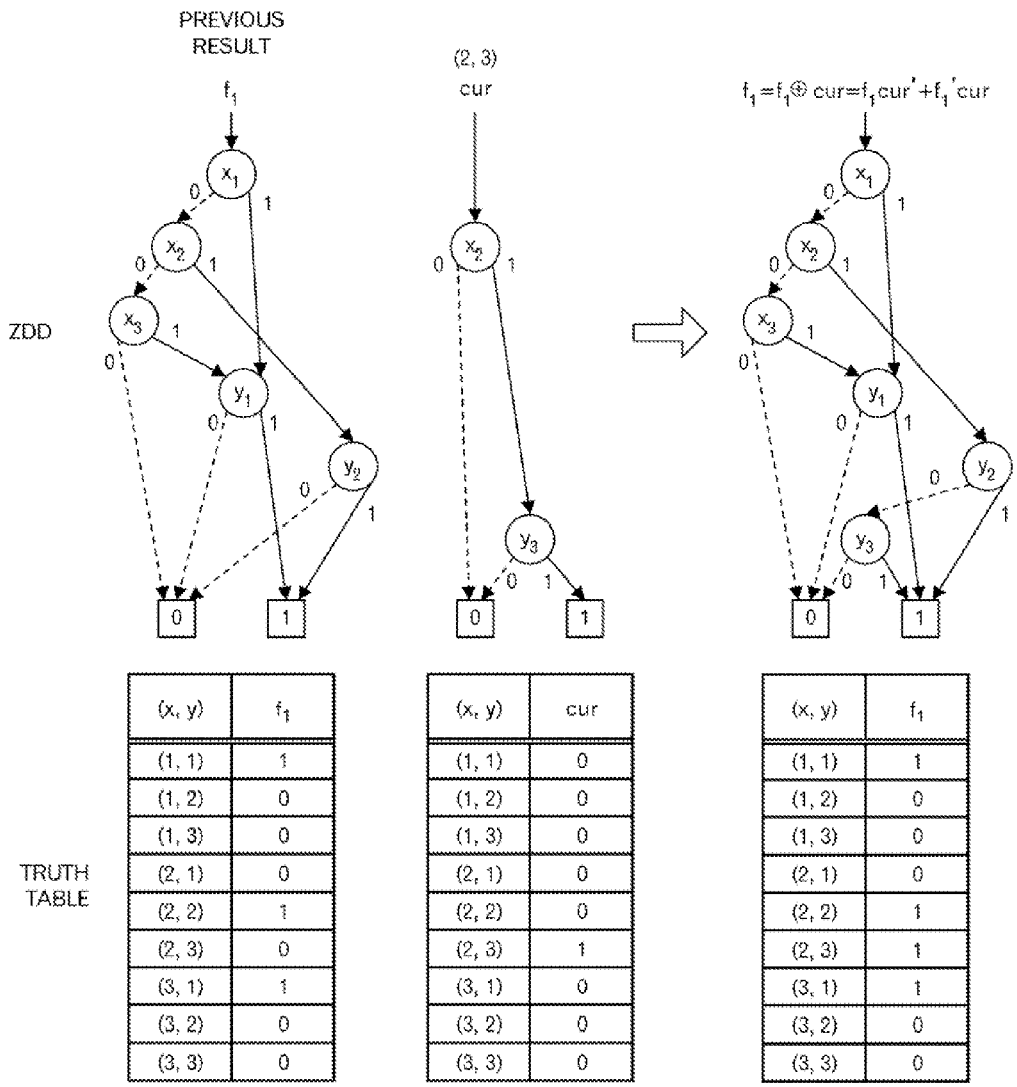
FIG. 24 is a diagram depicting a specific example of the ZDD generation.

Next, a case where the sample point (2,3) is processed is explained by using FIG. 24. As illustrated in FIG. 24, when ZDD representing the previous result and ZDD representing (2,3) are exclusively-ORed, ZDD representing (1,1), (3,1), (2,2) and (2,3) appear is generated. Incidentally, since there is no carry because of ZDD_g*ZDD_c=0, the processing shifts to a processing for the next sample point.

Figure 25:
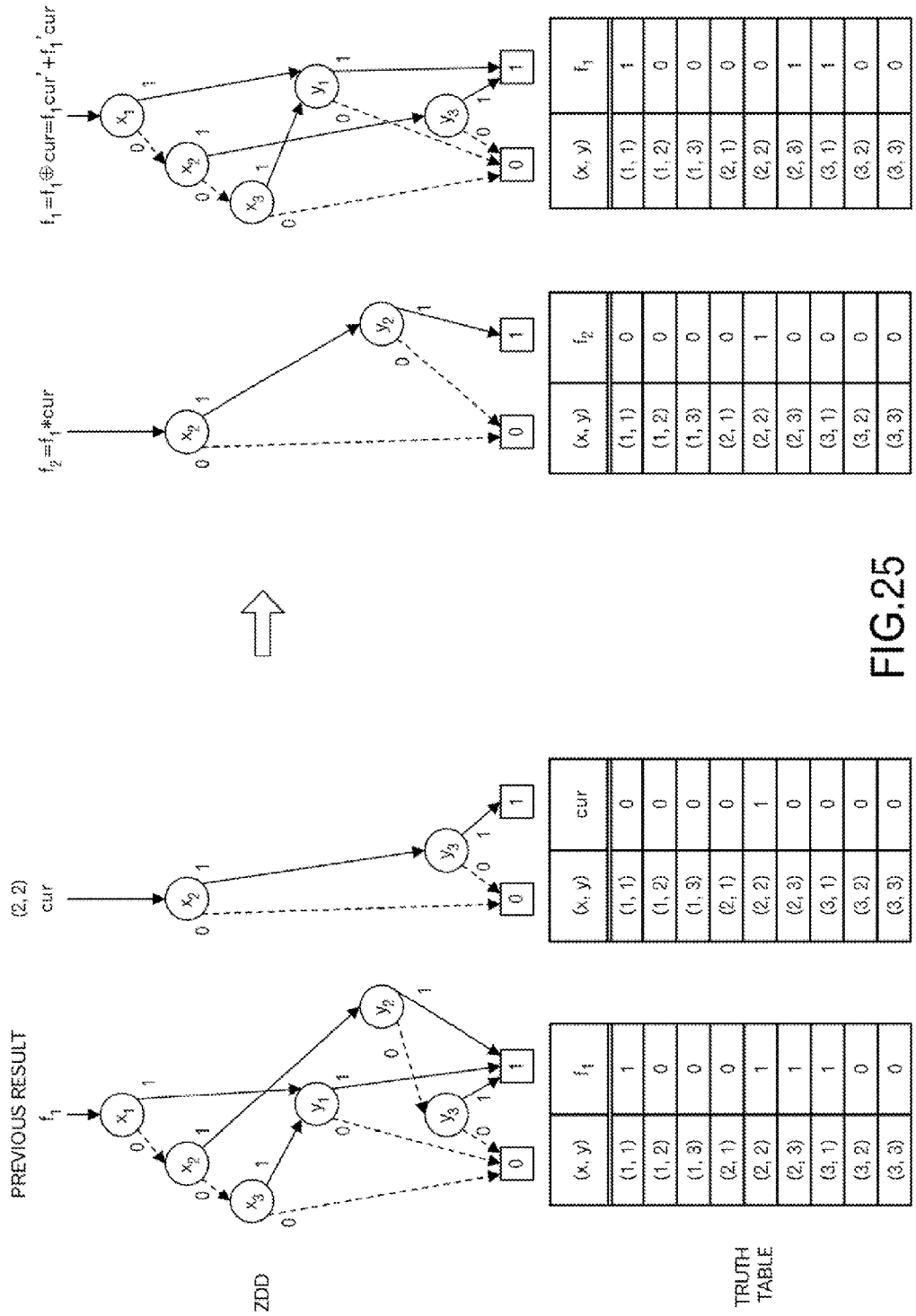
FIG. 25 is a diagram depicting a specific example of the ZDD generation.

Finally, a case where the sample point (2,2) is processed is explained by using FIG. 25. As illustrated in FIG. 25, when ZDD representing the previous result and ZDD representing (2,2) are exclusively-ORed, ZDD_f[1] (which is represented by $f_1$) representing that (1,1), (3,1) and (2,3) appear is generated. Furthermore, since there is a carry because of ZDD_g*ZDD_c=1, ZDD_c representing (2,2) is generated, and this is set to ZDD_f[2] (which is represented by $f_2$) as it is.

Thus, two ZDDs are generated and used in the following processing.

Figures 26, 28:
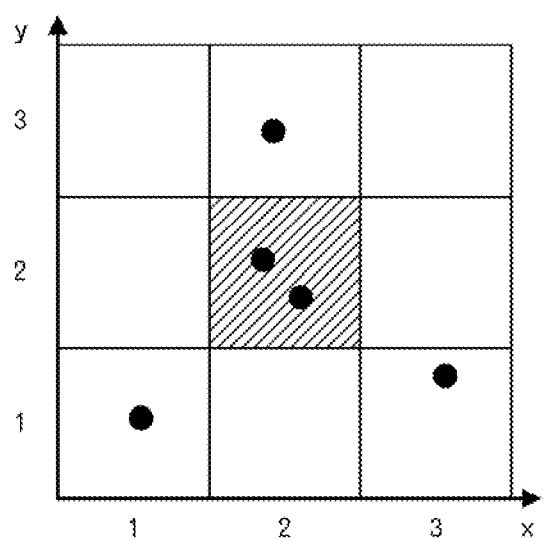
FIG. 26 is a diagram depicting a frequency table represented by the generated ZDD.
FIG. 28 is a diagram depicting coordinate values of a specific sample point.

Incidentally, when those two ZDDs are represented in a form of the frequency table, a table as illustrated in FIG. 26 is obtained. In the frequency table in FIG. 26, for each combination of the possible coordinate values for each axis, a frequency table of two bits "$f_2f_1$" is represented. In other words, as illustrated in a column of F, "01" corresponds to "1", and "10" corresponds to "2".

Returning to the explanation of the processing in FIG. 5, the yield calculation unit 123 of the processing unit 120 identifies one unprocessed sample point in the coordinate list L (step S5). Then, the yield calculation unit 123 carries out a processing to count the number of sample point for the identified sample point (step S9). The processing to count the number of sample points will be explained by using FIGS. 27 to 40.

Figure 27:
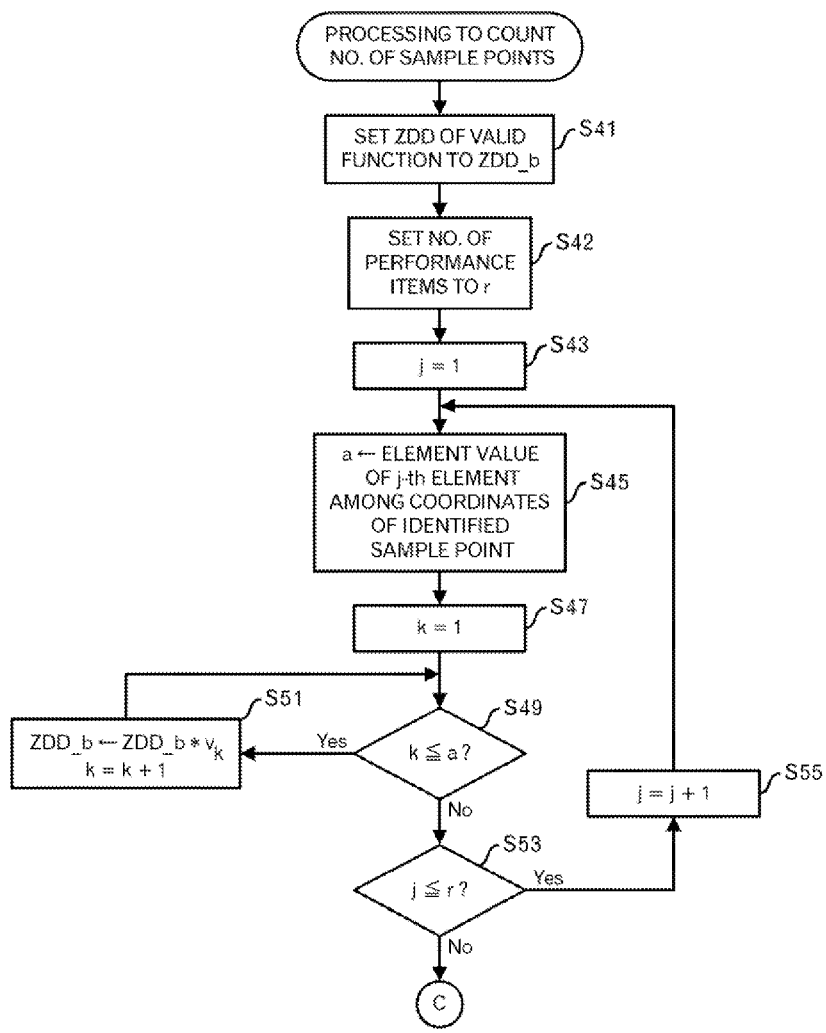
FIG. 27 is a diagram depicting a processing flow of a processing to count the number of sample points.

First, the yield calculation unit 123 sets ZDD of a valid function to ZDD_b (FIG. 27: step S41). Then, the yield calculation unit 123 sets the number of performance items to r (step S42). In addition, the yield calculation unit 123 sets "1" to j (step S43).

Furthermore, the yield calculation unit 123 sets an element value of a j-th element in the coordinates of the identified sample point to "a" (step S45). For example, as illustrated in FIG. 28, the sample point (2,2) is identified. Then, in case of j=1, a=2, and in case of j=2, a=2. Incidentally, the j-th element is represented by "v".

Incidentally, when the sample point (2,2) is identified, (1,2), (1,1) and (2,1) are the coordinate values of the sample points that dominate this sample point. Furthermore, when the yield is calculated, the coordinate values (2,2) and itself are to be counted. In other words, x≤2 and y≤2 are conditions for counting the number of sample points.

Then, the yield calculation unit 123 initializes k to "1" (step S47). After that, the yield calculation unit 123 determines whether or not k is equal to or less than "a" (step S49). When k is equal to or less than "a", the yield calculation unit 123 sets ZDD_b*$v_k$ to ZDD_b, and increments k by "1" (step S51). Then, the processing returns to the step S49.

As for $v_k$, in case of j=1, v=x, and in case of j=2, v=y. Namely, $x_1$ is multiplied with ZDD_b of the valid function, and $x_2$ is multiplied with ZDD_b of the valid function, in a loop for the first j. Furthermore, in the second loop, j=2. Therefore, $y_1$ and $y_2$ are multiplied with ZDD_b.

When k exceeds "a" at the step S49, the yield calculation unit 123 determines whether or not j is equal to or less than r (step S53). When j exceeds r, the processing shifts to a processing of FIG. 30 through terminal C. On the other hand, when j is equal to less than r, the yield calculation unit 123 increments j by "1" (step S55), and the processing returns to the step S45.

Figure 29:
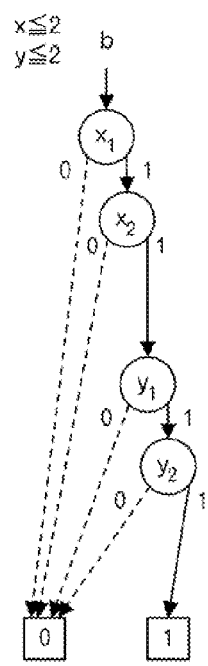
FIG. 29 is a diagram depicting an example of ZDD_b.

By carrying out such a processing, when the sample point (2,2) is identified, ZDD_b illustrated in FIG. 29 is generated. As illustrated in FIG. 29, ZDD is generated in which a path reaches a leaf node representing "1" when all of nodes $x_1$, $x_2$, $y_1$ and $y_2$, which correspond to the respective coordinate values that satisfy the condition x≤2 and y≤2, which are identified at the sample point (2,2), represent "1".

Figure 31:
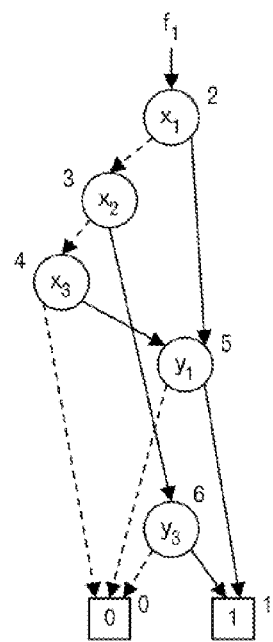
FIG. 31 is a diagram to explain an identifier of ZDD_f [1]
Figure 30:
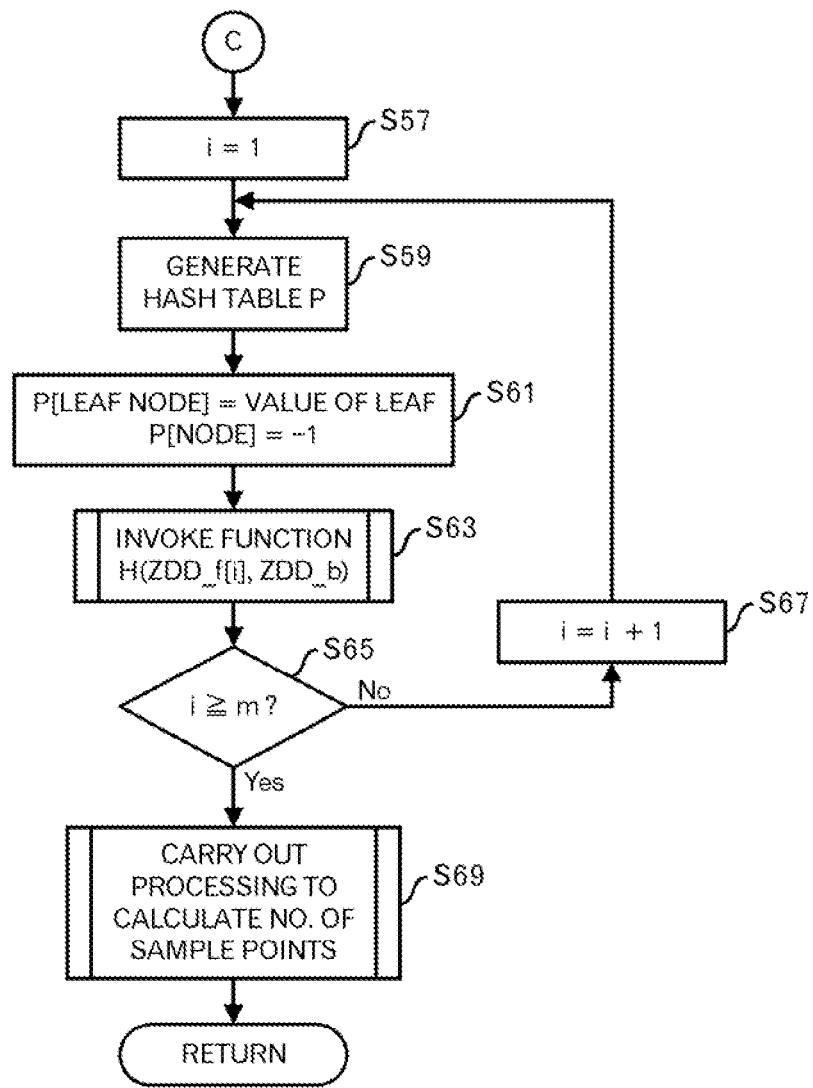
FIG. 30 is a diagram depicting a processing flow of the processing to count the number of sample points.
Figure 32:
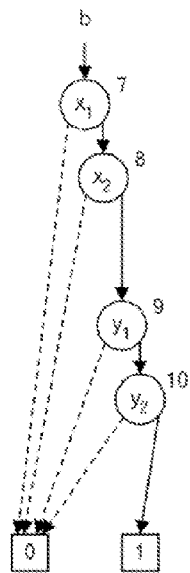
FIG. 32 is a diagram to explain an identifier of ZDD_b.

Shifting to the processing of FIG. 30 through the terminal C, the yield calculation unit 123 initializes the counter i to "1" (step S57). In addition, the yield calculation unit 123 generates a hash table P for registering the number of paths in association with each node of ZDD_f[i], from ZDD_f[i] (step S59). The hash table P is to register the number of paths for each node. In the following, in order to make the explanation easy to understand, it is assumed that identifiers as illustrated in FIG. 31 are allocated. In an example of FIG. 31, the identifier of the leaf node representing "0" is "0", the identifier of the leaf node representing "1" is "1", the identifier of the root node $x_1$ is "2", the node identifier of $x_2$ is "3", a node identifier of $x_3$ is "4", the node identifier of $y_1$ is "5", and the node identifier of $y_3$ is "6". Then, in the hash table P, as illustrated in FIG. 33A, for example, the number of paths is registered for each node identifier 0 to 6. Incidentally, at this stage, the number of paths is not registered. In addition, as for ZDD_b, as illustrated in FIG. 32, the node identifiers are allocated in order to make the explanation easy to understand.

Next, the yield calculation unit 123 sets the hash table P [leaf node]=value of the leaf node, and P[other nodes]=−1 (step S61). At this step, initial values are set. A state illustrated in FIG. 33A is obtained with this step.

After that, the yield calculation unit 123 sets, as arguments, root nodes of ZDD_f[i] and ZDD_b, and invokes a function H (fnode, bnode) (step S63). The function H is a function for completing the hash table to obtain the number of paths, which is a first argument. A processing of this function H will be explained by using FIGS. 34 to 40.

Figure 34:
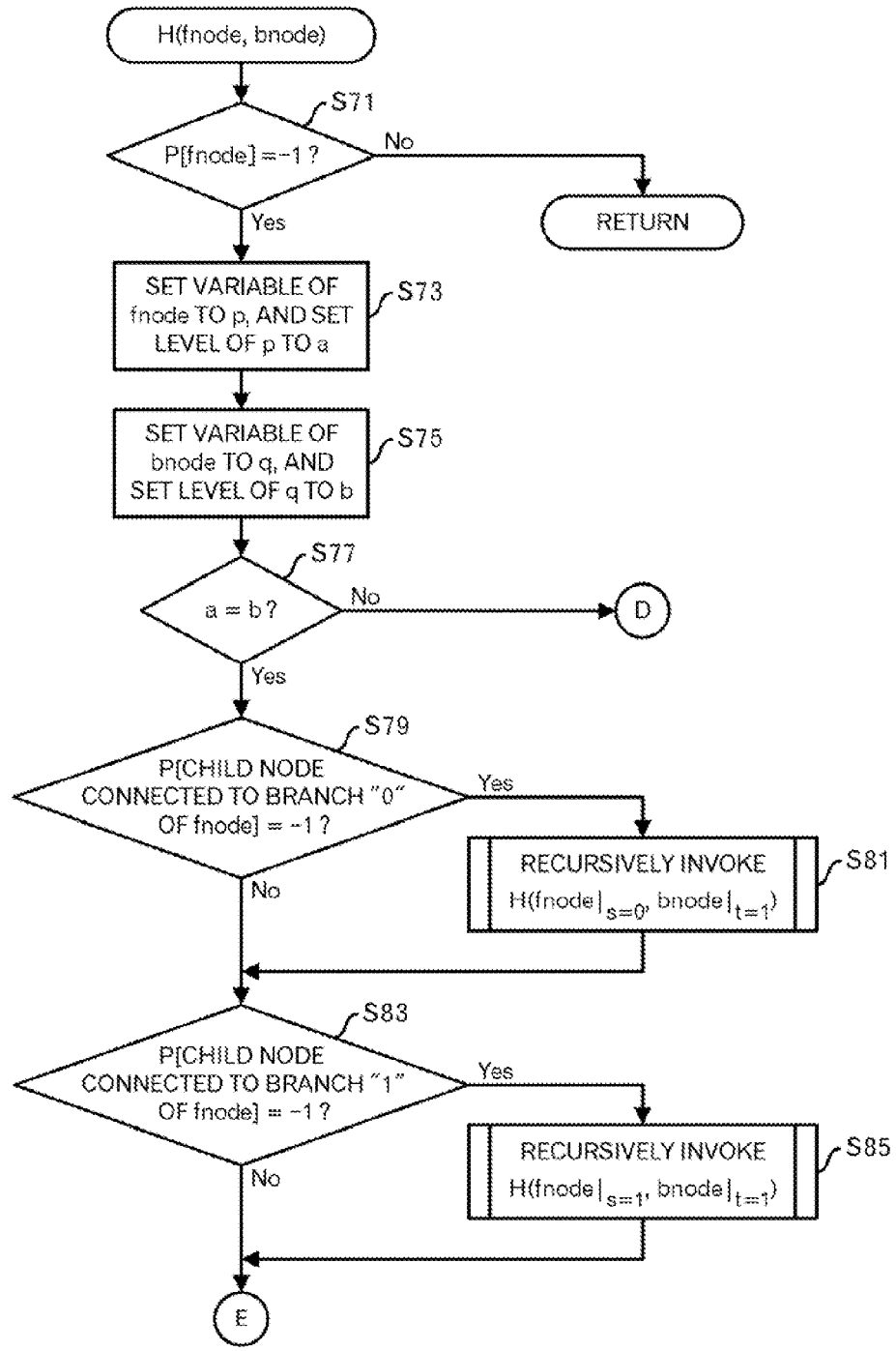
FIG. 34 is a diagram depicting a processing flow of a function H.

The yield calculation unit 123 determines whether or not P[fnode]=−1 (FIG. 34: step S71). "−1" is an initial value, and when any value other than "−1" is set, a processing for a node "fnode" is completed. Therefore, the processing returns to a calling-source processing. On the other hand, when the initial value "−1" is still set, the yield calculation unit 123 sets the variable of fnode to "p", and sets the level of "p" to "a" (step S73). When fnode is the node 2 in FIG. 31, p=$x_1$ and a=1 are set according to FIG. 20.

Moreover, the yield calculation unit 123 sets the variable of the node bnode to "q" and sets the level of "q" to "b" (step S75). When bnode is the node 7 in FIG. 32, q=$x_1$ and b=1 are set according to FIG. 20.

Then, the yield calculation unit 123 determined whether or not a=b is satisfied (step S77). When a=b is not satisfied, the processing shifts to a processing of FIG. 35 through terminal D. On the other hand, when a=b is satisfied, the yield calculation unit 123 determines whether or not P [child node connected to a branch of false "0" of fnode]=−1 is satisfied (step S79). In the hash table P (FIG. 33A), when fnode is the node 2 in FIG. 31, a value of the node 3 that is a child node connected to a branch of false "0" of fnode is "−1".

When P[child node connected to branch of false "0" of fnode]=−1 is not satisfied, the processing shifts to step S83. On the other hand, when P[child node connected to branch of false "0" of fnode]=−1 is satisfied, the yield calculation unit 123 recursively invokes a function H (fnode|$_{s=0}$, bnode|$_{t=1}$) (step S81). s=0 represents a child node connected to a branch of false "0" of fnode, and t=1 represents a child node connected to a branch of true "1" of bnode. Therefore, in the aforementioned example, the node 3 in FIG. 31 and the node 8 in FIG. 32 are set as the first argument and second argument in the function H. When the step S81 is completed, the processing shifts to step S83.

After the step S81 or when P[child node connected to branch of false "0" of fnode]=−1 is not satisfied, the yield calculation unit 123 whether or not P[child node connected to branch of true "1" of fnode]=−1 is satisfied (step S83). When P[child node connected to branch of true "1" of fnode]=−1 is not satisfied, the processing shifts to a processing of FIG. 35 through terminal E. On the other hand, When P[child node connected to branch of true "1" of fnode]=−1 is satisfied, the yield calculation unit 123 recursively invokes the function H (fnode|$_{s=1}$, bnode|$_{t=1}$) (step S85). s=1 represents a child node connected to a branch of true "1" of fnode, and t=1 represents a child node connected to a branch of true "1" of bnode. Therefore, in the aforementioned example, the node 5 in FIG. 31 and the node 8 in FIG. 32 are set as the first argument and the second argument in the function H. When the step S85 is completed, the processing shifts to the processing of FIG. 35 through the terminal E.

Figure 35:
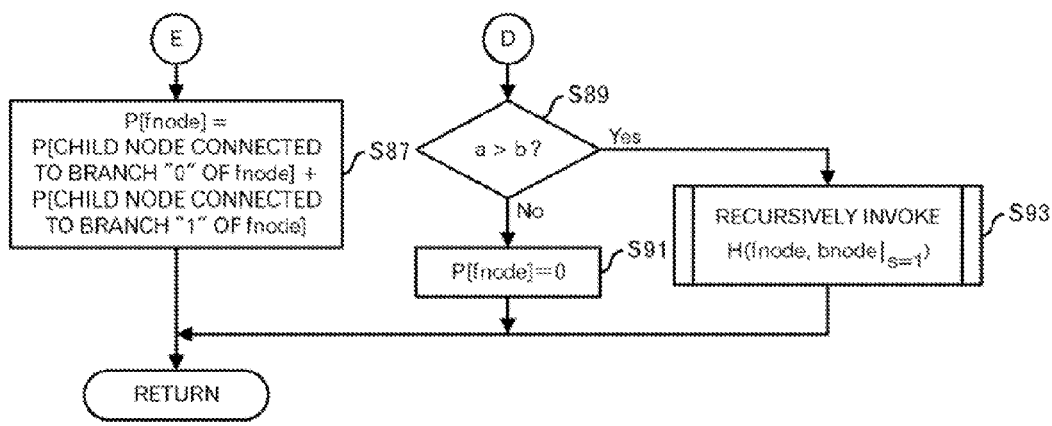
FIG. 35 is a diagram depicting a processing flow of the function H.

In FIG. 35, shifting to the explanation of the processing subsequent to the terminal E, the yield calculation unit 123 sets P[fnode]=P[child node connected to branch of false "0" of fnode]+P[child node connected to branch of true "1" of fnode] (step S87). Then, the processing returns to the calling source processing.

Furthermore, shifting to the explanation of the processing subsequent to the terminal D in FIG. 35, the yield calculation unit 123 determines whether or not a>b is satisfied (step S89). When the level a of fnode is greater than the level b of bnode, the yield calculation unit 123 recursively invokes H (fnode, bnode|$_{s=1}$) in order to bring the level of bnode closer to the level a (step S93). This means fnode is not changed, and bnode is changed to the child node connected to the child node of true "1". After the step S93, the processing returns to the calling source processing.

On the other hand, in case of a<b, there is no node whose level is the same as that of fnode for bnode, the yield calculation unit 123 sets P[fnode]=0 (step S91). Then, the processing returns to the calling source processing.

Figure 36:
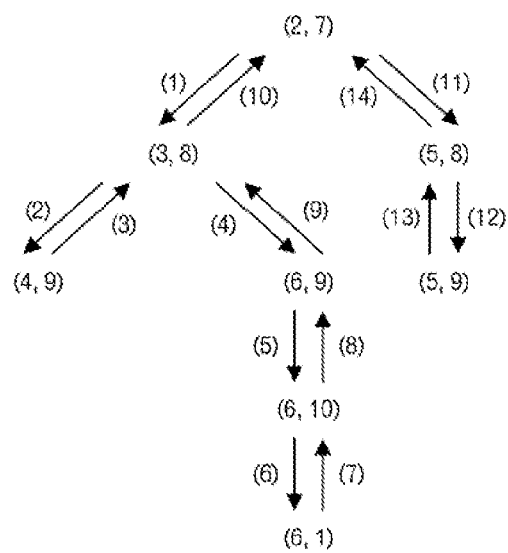
FIG. 36 is a diagram to explain search of ZDD_f [1]

In the aforementioned example, at the step S81, the node 3 in FIG. 31 and the node 8 in FIG. 32 are set as the first argument and the second argument of H, and the processing is carried out from the beginning in FIG. 34. In FIG. 36, it is assumed that (v, w) represents a node identifier v in FIG. 31 and a node identifier w in FIG. 32. Here, the transition (1) has been carried out.

In this case, a=b is satisfied at the step S77, and P[node 4 that is a child node connected to branch of false "0" of node 3]=−1. Therefore, the processing shifts to the step S81, again. In FIG. 36, the transition (2) has been carried out.

Then, the node 4 in FIG. 31 and the node 9 in FIG. 32 are set as the first argument and the second argument of H. Then, a=3 and b=4. Therefore, the processing shifts from the step S77 to the step S89. At the step S89, because a<b is satisfied, the processing shifts to the step S91. Then, because the node identifier of fnode is "4", P[4]=0 is set. In other words, the hash table P as illustrated in FIG. 33B is obtained. In FIG. 36, the transition (3) is carried out, and the processing returns to the processing for an immediately upper layer.

Then, at the step S83, P[child node connected to branch of true "1" of node 3 that is fnode]=−1. At the step S85, the node 6 in FIG. 31 and the node 9 in FIG. 32 are set to the first argument and the second argument of H, and the processing is carried out from the beginning of FIG. 34. In FIG. 36, the transition (4) has been carried out.

Then, because a=6 and b=4 are satisfied, the processing shifts from the step S77 to the step S89, and because a>b is satisfied, the processing shifts to the step S93. Here, the node 6 in FIG. 31 and the node 10 in FIG. 32 are set to the first argument and the second argument of H, and the processing is carried out from the beginning of FIG. 34. In FIG. 36, the transition (5) has been carried out.

Then, because a=6 and b=5 are satisfied, the processing shifts from the step S77 to the step S89. Furthermore, because a>b is satisfied, the processing shifts to the step S93. Here, the node 6 in FIG. 31 and the leaf node representing "1" in FIG. 32 are set to the first argument and the second argument of H, and the processing is carried out from the beginning of FIG. 34. In FIG. 36, the transition (6) has been carried out.

Then, because a=6 and b=7 are satisfied, the processing shifts from the step S77 to the step S89. Furthermore, because of a<b, the processing shifts to the step S91. Then, because the node identifier of fnode is "6", P[6]=0 is set. In other words, the hash table P is changed to a table illustrated in FIG. 33C. In FIG. 36, the transition (7) has been carried out to return to the processing for an immediately upper layer. However, when the step S93 is completed, the processing returns to the processing for a further immediately upper layer. Therefore, in FIG. 36, the transition (8) is carried out to return to the processing for an immediately upper layer. Furthermore, because the step S93 is completed also in this layer, the processing returns to the processing for a further immediately upper layer. Then, in FIG. 36, the transition (9) is carried out to return to the processing for an immediately upper layer.

Then, the step S85 is completed to shift to the step S87, and P[node 4 that is child node connected to branch of false "0" of node 3]+P[node 6 that is child node connected to branch of true "1" of node 3]=P[3]=0+0=0 is set. In other words, the hash table P is changed to a table as illustrated in FIG. 33D. Then, in FIG. 36, the transition (10) has been carried out to return to the processing for an immediately upper layer.

Returning to the processing for the root node, because of P[child node connected to branch of true "1" of node 2]=P[5] =−1, the processing shifts to the step S85. Then, the node 5 in FIG. 31 and the node 8 in FIG. 32 are set to the first argument and the second argument of H, and the processing is carried out from the beginning of FIG. 34. In FIG. 36, the transition (11) has been carried out.

Then, because of a=4 and b=2, the processing shifts from the step S77 to the step S89. In addition, because of a>b, the processing shifts to the step S93. Here, the node 5 in FIG. 31 and the node 9 in FIG. 32 are set to the first argument and the second argument of H, and the processing is carried out from the beginning in FIG. 34. In FIG. 36, the transition (12) has been carried out.

Then, because a=4 and b=4, the processing shifts from the step S77 to the step S79, and because of P[leaf node representing "0"=child node connected to branch of false "0" of node 5]=0, the processing shifts to the step S83. Furthermore, because of P[leaf node representing "1"=child node connected to branch of true "1" of node 5]=1, the processing shifts to the step S87. At the step S87, P [node 5]=P [leaf node representing "0"]+P [leaf node representing "1"]=0+1=1 is obtained. Accordingly, a state of the hash table P changes to a state as illustrated in FIG. 33E. In FIG. 36, the transition (13) is carried out to return to the processing for an immediately upper layer. However, when the step S93 is completed, the processing returns to the processing for a further immediately upper layer. Therefore, in FIG. 36, the transition (14) has been carried out to return to the processing for an immediately upper layer (the root node layer).

Because the step S85 is completed in the processing for the root node layer, the processing shifts to the step S87, and P[root node 2 of f1]=P[3]+P[5]=0+1=1 is obtained. Here, the hash table P is changed to the state illustrated in FIG. 33F. Therefore, the result P[2]=1 for the root node has been obtained.

Returning to the explanation of the processing in FIG. 30, the yield calculation unit 123 determines whether or not i is equal to or less than m (step S65). m represents the most upper digit which is not an inconsistent function among ZDD_f[i] (i is an integer from 1 to n). When i is less than m, the yield calculation unit 123 increments by "1" (step S67), and the processing returns to the step S59.

Figure 37:
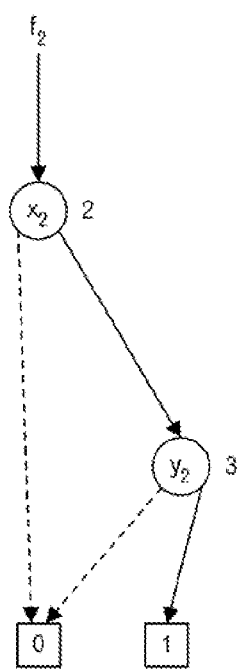
FIG. 37 is a diagram to explain a node identifier of ZDD_f [2]

In the aforementioned example, the processing for ZDD_f [2] is also carried out. In this case, when the identifier is allocated to the node as illustrated in FIG. 37, the hash table P as illustrated in FIG. 38 is obtained. In this example of FIG. 38, a value P[2]=1 for the identifier 2 of the root node is obtained.

On the other hand, when i is equal to or greater than m, the yield calculation unit 123 carries out a processing for counting the number of sample points (step S69). The processing for counting the number of sample points is explained by using FIG. 39. Then, the processing returns to the calling source processing.

The yield calculation unit 123 initializes the number of sample points S to "0" (FIG. 39: step S101). Moreover, the yield calculation unit 123 initializes a counter i to "1" (step S103). Then, the yield calculation unit 123 sets S+P [root node of ZDD_f [i]]*$2^{i-1}$ to S (step S105). At i=1, 1 (=P [root node of ZDD_f [1]])*$2^0$=1. Therefore, initially, S=1.

Then, the yield calculation unit 123 determines whether or not i is equal to or greater than m (step S107). When i is less than m, the yield calculation unit 123 increments i by "1" (step S109), and the processing returns to the step S105.

In case of i=2, 1 (=P [root node of ZDD_f[2]])*$2^1$=2. Therefore, S=3.

When i is equal to or greater than m, the yield calculation unit 123 stores S as the number of sample points, into the data storage unit 110 (step S111). Then, the processing returns to the calling source processing.

Incidentally, this number of sample points is the number of sample points including other sample points having the same coordinate values and its own sample point.

Returning to the explanation of FIG. 5, the yield calculation unit 123 calculates the yield by dividing the number of sample points S by the number of all sample points, and stores the calculated yield into the data storage unit 110 (step S11). With this processing, data as illustrated, for example, in FIG. 40 is stored in the data storage unit 110. In other words, for each sample point, values are set to a column of the number of sample points and a column of the yield.

Then, the yield calculation unit 123 determines whether or not there is an unprocessed sample point in the coordinate list L (step S13). When there is an unprocessed sample point, the processing returns to the step S5. On the other hand, when there is no unprocessed sample point, the processing ends.

Figure 41:
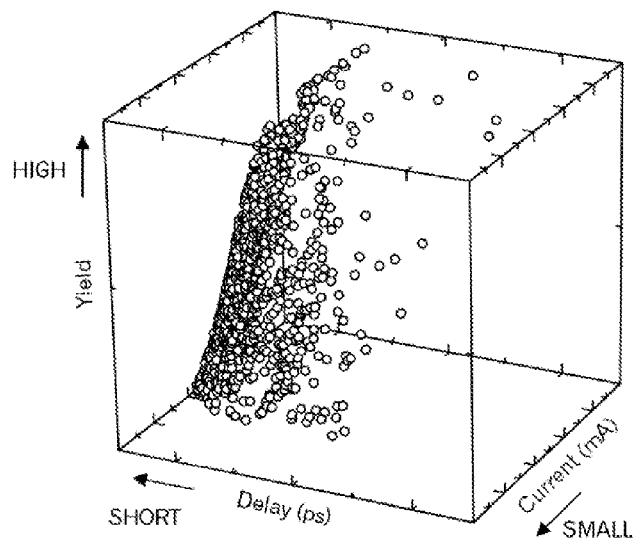
FIG. 41 is a diagram depicting a display example of a processing result.
Figure 42:
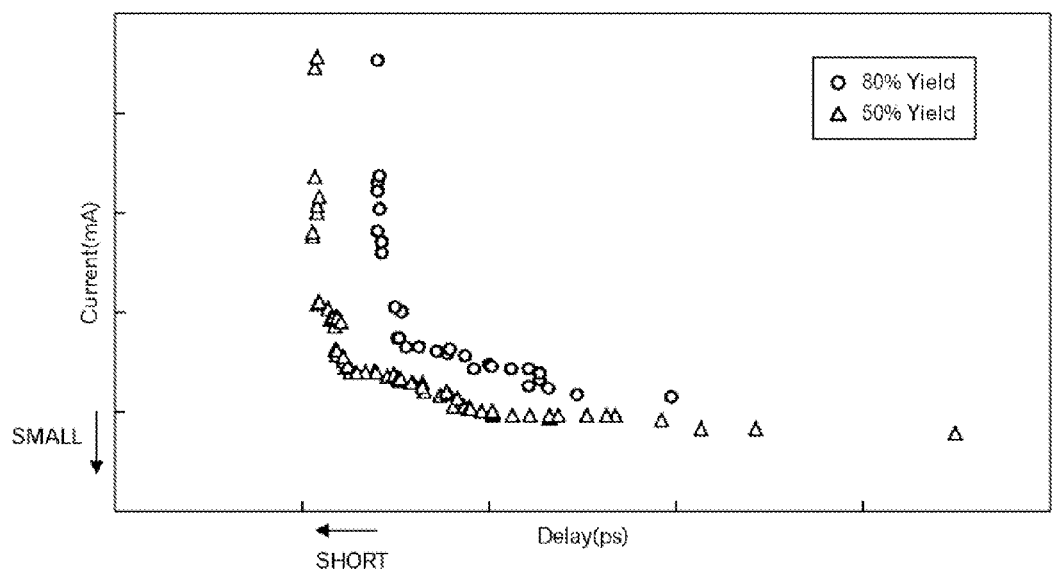
FIG. 42 is a diagram depicting a display example of a processing result.

By carrying out such a processing, the yield for each sample point is calculated rapidly. Therefore, a graph as illustrated, for example, in FIG. 41 can be displayed, rapidly. In the example of FIG. 41, when the performance item 1 is delay (delay (ps)) (corresponding to X axis), and the performance item 2 is electric current (Current (mA)) (corresponding to Y axis), and the yield is represented by Z axis, a curved surface is obtained which represents that the yield is high when the delay is long and the electric current is large. Incidentally, by designating a specific yield and cutting the curved surface by a plane parallel with XY plane, a diagram as illustrated in FIG. 42 can be displayed. In the example of FIG. 42, the sample points whose yield is 80% or more are represented by circle marks, and the sample points whose yield is 50% or more are represented by triangle marks. Thus, each distribution can be easily grasped.

Embodiment 2

The configuration of the information processing apparatus relating to this embodiment is the same as that of the first embodiment. Therefore, the explanation is omitted. However, the processing contents of the respective elements are changed to those in the following.

Figures 43, 44:
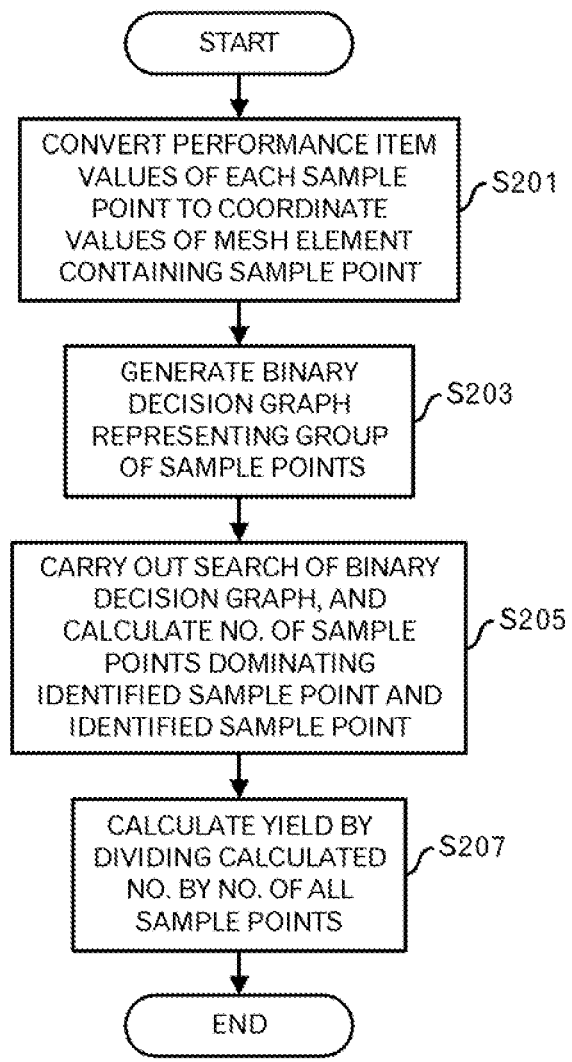
FIG. 43 is a diagram depicting a processing flow relating to a second embodiment.
FIG. 44 is a diagram depicting a list of nodes to be traced.

The information processing apparatus 100 relating to this embodiment carries out a processing illustrated in FIGS. 43 to 47. The converter 121 of the processing unit 120 carries out meshing of the performance space, and converts the coordinate values (i.e. performance item values) of each sample point, which are stored in the data storage unit 110 to coordinate values of the mesh element containing the sample point, and stores the processing results into the data storage unit 110 (FIG. 43: step S201). This processing is a processing explained by using FIGS. 6 and 7. In addition, data as illustrated in FIG. 8 is stored into the data storage unit 110.

Next, the generator 122 generates a binary decision graph (e.g. ZDD or BDD) that represents a group of sample points stored in the data storage unit 110 (step S203). The method for generating ZDD or the like is the same as that described in the first embodiment.

Then, the yield calculation unit 123 carries out a search of the binary decision graph as described below, calculates the number of sample points including sample points that dominates a specific sample point and the specific sample point, and stores the calculated values into the data storage unit 110 (step S205). Specifically, the search of the binary decision graph is carried out so as to trace nodes corresponding to the coordinate values equal to or less than the respective coordinate values of a specific sample point from the root node in the binary decision graph and count the number of paths to the leaf node representing "1". For example, when the sample point (x, y)=(2, 2) is the specific sample point, $x_1$, $x_2$, $y_1$ and $y_2$ that are nodes corresponding to the coordinate values (x≤2 and y≤2) equal to less than that of the specific sample point are identified as the node to be traced. Then, paths from the root node in the binary decision graph through the identified node to the leaf node representing "1" are searched. In case of ZDD in FIG. 45, one path from the root node $x_1$ to the leaf node representing "1" through $y_1$ without passing nodes other than the nodes illustrated in FIG. 44 is identified.

Figure 46:
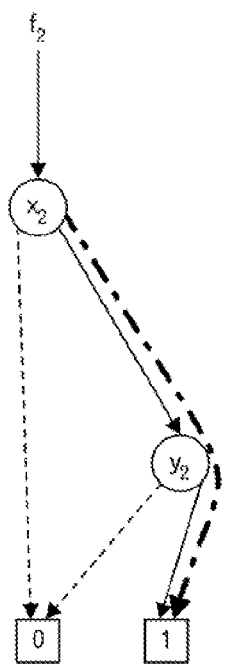
FIG. 46 is a diagram depicting node search in ZDD_f [2]

In case of the ZDD as illustrated in FIG. 46, one path from the root node $x_2$ to the leaf node representing "1" through $y_2$ without passing through nodes other than nodes as illustrated in FIG. 44 is identified.

Figure 47:
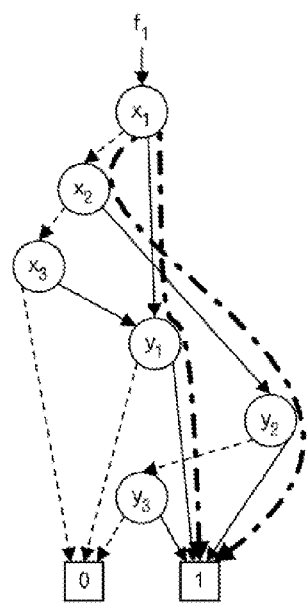
FIG. 47 is a diagram depicting node search in other ZDD.

In addition, in case of ZDD illustrated in FIG. 47, a first path from the root node $x_1$ through the nodes $x_2$ and $y_2$ and a second path through the node $y_1$ are obtained.

Figure 45:
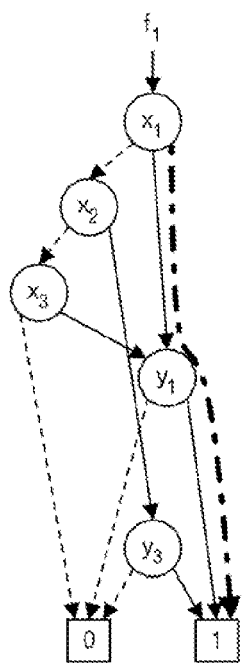
FIG. 45 is a diagram depicting node search in ZDD_f [1]

Incidentally, ZDD may be ZDD for only one digit or ZDD for two or more digits. In such a case, the number of paths is counted for each digit, and the number of paths is added after multiplying a weight $2^{i-1}$ for each digit i. For example, in case where FIG. 45 represents ZDD for the first digit and FIG. 46 represents ZDD for the second digit, 3 (=$1*2^{1-1}+1*2^{2-1}$) is calculated.

After that, the yield calculation unit 123 calculates the yield by dividing the number calculated at the step S205 by the number of all sample points, which are stored in the data storage unit 110, and stores the yield into the data storage unit 110 (step S207). Thus, data as illustrated in FIG. 48 is stored in the data storage unit 110. In the example of FIG. 48, an example is illustrated in which a sample point whose sample point ID is "1" is used as the specific sample point. When the steps S205 and S207 are carried out for other sample points, the number of sample points and yield are also stored into the data storage unit 110, similarly.

By carrying out such a processing, the generation of the binary decision graph is carried out only once, and the search of the binary decision graph is carried out only for each sample point. Therefore, it becomes possible to calculate the yield much efficiently, namely, faster than a case in which the domination relationship between each sample point and the other sample points. Incidentally, the aforementioned processing is carried out for the sample points belonging to the same mesh element only once. Therefore, also according to this point, the speed of the processing is enhanced.

Although the embodiments of this technique were explained, this technique is not limited to those embodiments. For example, the functional block diagram is a mere example, and does not always correspond to an actual program module configuration. Furthermore, as for the processing flow, as long as the processing result does not change, an order of the steps may be exchanged or the steps may be executed in parallel. The aforementioned processing may be executed by one or plural computers.

Figure 49:
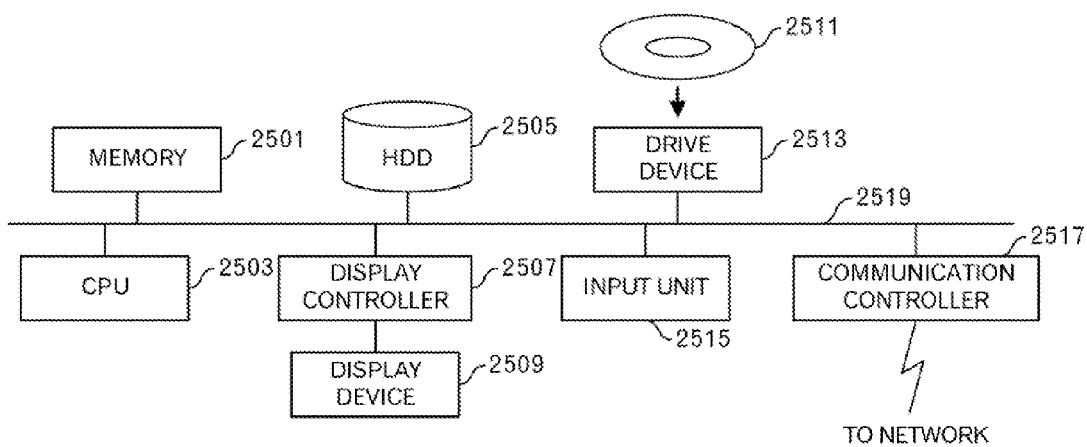
FIG. 49 is a functional block diagram of a computer.

In addition, the aforementioned information processing apparatus 100 is a computer device as illustrated in FIG. 49. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as illustrated in FIG. 49. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The aforementioned embodiments are summarized as follows:

An information processing method relating to the embodiments includes: (A) converting, for each of a plurality of sample points that are stored in a data storage unit, a set of plural kinds of performance item values for a sample point into coordinate values of a mesh element containing the set among a plurality of mesh elements obtained by dividing a space mapped by plural kinds of performance items, and storing the coordinate values of the mesh elements into the data storage unit; (B) generating a binary decision graph representing a group of the coordinate values of the plurality of sample points that are stored in the data storage unit; (C) first calculating the number of sample points including second sample points that dominates a first sample point and the first sample point, by counting the number of paths from a root node in the binary decision graph to a leaf node representing "1" in the binary decision graph through at least one of certain nodes corresponding to coordinate values that are equal to or less than coordinate values of the first sample point, wherein the second sample points and the first sample point are included in the plurality of sample points that are stored in the data storage unit; and (D) second calculating a yield of the first sample point by dividing the calculated number by the number of the plurality of sample points, and storing the yield into the data storage unit.

By carrying out this processing, after confirming the domination relationship between each sample point and the other sample point, the yield is calculated, efficiently and rapidly.

In addition, the aforementioned first calculating and second calculating may be carried out for each of the plurality of sample points as the first sample point. When a lot of sample points have to be processed, the effect becomes large.

Moreover, the first calculating may include: (c1) generating a second binary decision graph that has the certain nodes and in which, when all of the certain nodes represent true, a path reaches a leaf node representing "1" from the binary decision graph; and (c2) counting the number of paths from a root node in the second binary decision graph to the leaf node representing "1" through at least one of the certain nodes.

Furthermore, the first calculating comprises: searching nodes in the binary decision graph from the root node in a direction of a leaf node; terminating the searching upon detecting that it is confirmed that the searched node is not the certain node or upon detecting that a path of the searching reaches a leaf node representing "0" in the binary decision graph; and upon detecting that a path of the searching reaches the leaf node representing "1" in the binary decision graph, second counting the number of paths by returning to the root node while tracing the path of the searching in a reverse direction. By carrying out such a processing, it becomes possible to count the number of paths, appropriately.

Furthermore, the returning may include: adding, at a node on the path, the number of paths in a direction of a false branch and the number of paths in a direction of a true branch, and shifting to a next node on the path in the direction of the root node. The efficiency of the processing can be enhanced.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a process, the process comprising:
   converting, for each of a plurality of sample points, values of a plurality of performance items for analog circuits into coordinate values of a mesh element among a plurality of mesh elements obtained by dividing a space mapped by the plurality of performance items for the analog circuits;
   generating a binary decision graph representing a group of the coordinate values of the plurality of sample points, wherein the binary decision graph includes a plurality of nodes each of which represents one coordinate value in an axis for one of the plurality of performance items for the analog circuits;
   identifying, from among the plurality of nodes, first nodes whose coordinate values are equal to or less than coordinate values of a first sample point of the plurality of sample points;
   searching the binary decision graph for first paths each of which satisfies a condition that a start of the first path is a root node in the binary decision graph, an end of the first path is a leaf node representing "1", and each node that is on the first path and is other than the root node and the leaf node corresponds to any one of the first nodes;
   counting the number of the first paths; and
   calculating a yield of an analog circuit corresponding to the first sample point by dividing the counted number of the first paths by the number of the plurality of sample points.

2. The computer-readable, non-transitory storage medium as set forth in claim 1, wherein the identifying, the searching, the counting and the calculating are carried out for each of the plurality of sample points as the first sample point.

3. The computer-readable, non-transitory storage medium as set forth in claim 1, wherein the searching comprises:
   generating a second binary decision graph that has the first nodes and in which, when all of the first nodes represent true, a path reaches a leaf node representing "1" from the binary decision graph; and
   searching the binary decision graph for the first paths from a root node in the second binary decision graph to the leaf node representing "1" through at least one of the first nodes.

4. The computer-readable, non-transitory storage medium as set forth in claim 1, wherein the searching comprises:
   searching nodes in the binary decision graph from the root node in a direction of a leaf node;
   terminating the searching upon detecting that it is confirmed that the searched node does not correspond to one of the first nodes or upon detecting that a path of the searching reaches a leaf node representing "0" in the binary decision graph; and
   upon detecting that a path of the searching reaches the leaf node representing "1" in the binary decision graph, searching for the first paths by returning to the root node while tracing the path of the searching in a reverse direction.

5. The computer-readable, non-transitory storage medium as set forth in claim 4, wherein the returning comprises: adding, at a node on the path, the number of paths in a direction of a false branch and the number of paths in a direction of a true branch, and shifting to a next node on the path in the direction of the root node.

6. An information processing method comprising:
   converting, by using a computer, for each of a plurality of sample points, values of a plurality of performance items for analog circuits into coordinate values of a mesh element among a plurality of mesh elements obtained by dividing a space mapped by the plurality of performance items for the analog circuits;

generating, by using the computer, a binary decision graph representing a group of the coordinate values of the plurality of sample points, wherein the binary decision graph includes a plurality of nodes each of which represents one coordinate value in an axis for one of the plurality of performance items for the analog circuits;

identifying, from among the plurality of nodes and by using the computer, first nodes whose coordinate values are equal to or less than coordinate values of a first sample point of the plurality of sample points;

searching, by using the computer, the binary decision graph for first paths each of which satisfies a condition that a start of the first path is a root node in the binary decision graph, an end of the first path is a leaf node representing "1", and each node that is on the first path and is other than the root node and the leaf node corresponds to any one of the first nodes;

counting, by using the computer, the number of the first paths; and calculating, by using the computer, a yield of an analog circuit corresponding to the first sample point by dividing the counted number of the first paths by the number of the plurality of sample points.

7. The information processing method as set forth in claim 6, wherein the identifying, the searching, the counting and the calculating are carried out for each of the plurality of sample points as the first sample point.

8. The information processing method as set forth in claim 6, wherein the searching comprises:

generating a second binary decision graph that has the first nodes and in which, when all of the first nodes represent true, a path reaches a leaf node representing "1" from the binary decision graph; and searching the binary decision graph for the first counting the number of paths from a root node in the second binary decision graph to the leaf node representing "1" through at least one of the first nodes.

9. The information processing method as set forth in claim 6, wherein the counting comprises:

searching nodes in the binary decision graph from the root node in a direction of a leaf node;

terminating the searching upon detecting that it is confirmed that the searched node does not correspond to one of the first nodes or upon detecting that a path of the searching reaches a leaf node representing "0" in the binary decision graph; and upon detecting that a path of the searching reaches the leaf node representing "1" in the binary decision graph, searching for the first paths by returning to the root node while tracing the path of the searching in a reverse direction.

10. The information processing method as set forth in claim 9, wherein the returning comprises: adding, at a node on the path, the number of paths in a direction of a false branch and the number of paths in a direction of a true branch, and shifting to a next node on the path in the direction of the root node.

11. An information processing apparatus, comprising:
a memory; and
a processor configured to use the memory and execute a process, the process comprising:
converting, for each of a plurality of sample points, values of a plurality of performance items for analog circuits into coordinate values of a mesh element among a plurality of mesh elements obtained by dividing a space mapped by the plurality of performance items for the analog circuits;

generating a binary decision graph representing a group of the coordinate values of the plurality of sample points, wherein the binary decision graph includes a plurality of nodes each of which represents one coordinate value in an axis for one of the plurality of performance items for the analog circuits;

identifying, from among the plurality of nodes, first nodes whose coordinate values are equal to or less than coordinate values of a first sample point of the plurality of sample points;

searching the binary decision graph for first paths each of which satisfies a condition that a start of the first path is a root node in the binary decision graph, an end of the first path is a leaf node representing "1", and each node that is on the first path and is other than the root node and the leaf node corresponds to any one of the first nodes;

counting the number of the first paths; and calculating a yield of an analog circuit corresponding to the first sample point by dividing the counted number of the first paths by the number of the plurality of sample points.

12. The information processing apparatus as set forth in claim 11, wherein the identifying, the searching, the counting and the calculating are carried out for each of the plurality of sample points as the first sample point.

13. The information processing apparatus as set forth in claim 11, wherein the searching comprises:

generating a second binary decision graph that has the first nodes and in which, when all of the first nodes represent true, a path reaches a leaf node representing "1" from the binary decision graph; and searching the binary decision graph for the first paths from a root node in the second binary decision graph to the leaf node representing "1" through at least one of the first nodes.

14. The information processing apparatus as set forth in claim 11, wherein the searching comprises:

searching nodes in the binary decision graph from the root node in a direction of a leaf node;

terminating the searching upon detecting that it is confirmed that the searched node does not correspond to one of the first nodes or upon detecting that a path of the searching reaches a leaf node representing "0" in the binary decision graph; and upon detecting that a path of the searching reaches the leaf node representing "1" in the binary decision graph, searching for the first paths by returning to the root node while tracing the path of the searching in a reverse direction.

15. The information processing apparatus as set forth in claim 14, wherein the returning comprises: adding, at a node on the path, the number of paths in a direction of a false branch and the number of paths in a direction of a true branch, and shifting to a next node on the path in the direction of the root node.

* * * * *